US009654457B2

(12) United States Patent
Kamikawa et al.

(10) Patent No.: US 9,654,457 B2
(45) Date of Patent: May 16, 2017

(54) INFORMATION PROCESSING SYSTEM, INFORMATION PROCESSING APPARATUS, STORAGE MEDIUM AND INFORMATION PROCESSING METHOD

(71) Applicant: NINTENDO CO., LTD., Kyoto (JP)

(72) Inventors: Yoji Kamikawa, Kyoto (JP); Taiyo Hara, Kyoto (JP); Makoto Takano, Kyoto (JP); Kojiro Taguchi, Kyoto (JP); Hirokazu Shimaoka, Kyoto (JP); Yuya Ono, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 459 days.

(21) Appl. No.: 13/874,984

(22) Filed: May 1, 2013

(65) Prior Publication Data

US 2014/0143832 A1    May 22, 2014

(30) Foreign Application Priority Data

Nov. 16, 2012    (JP) ................................. 2012-252450

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |

(52) U.S. Cl.
CPC .............. *H04L 63/08* (2013.01); *H04L 63/10* (2013.01)

(58) Field of Classification Search
CPC ............................... G06Q 30/02; H04L 63/101
USPC ........................................................ 726/2–4
See application file for complete search history.

(56) References Cited

U.S. PATENT DOCUMENTS

| | | | |
|---|---|---|---|
| 2007/0067828 A1* | 3/2007 | Bychkov | ........................... 726/3 |
| 2007/0155204 A1* | 7/2007 | Klitsner et al. | ............... 439/131 |
| 2012/0017262 A1* | 1/2012 | Kapoor et al. | .................... 726/1 |
| 2012/0069131 A1* | 3/2012 | Abelow | ..................... 348/14.01 |
| 2012/0238363 A1 | 9/2012 | Watanabe et al. | |
| 2014/0096203 A1 | 4/2014 | Takahashi et al. | |

FOREIGN PATENT DOCUMENTS

| | | |
|---|---|---|
| JP | 2009-086960 | 4/2009 |
| JP | 2011-100207 | 5/2011 |
| JP | 2012-192019 | 10/2012 |
| JP | 2014-71731 | 4/2014 |

* cited by examiner

*Primary Examiner* — Taghi Arani
*Assistant Examiner* — Khalil Naghdali
(74) *Attorney, Agent, or Firm* — Nixon & Vanderhye PC

(57) ABSTRACT

A non-limiting example game system includes a game apparatus which is stored with various kinds of application programs. When an application program for a specific service such as a television program guide (program guide program) is started, prior to an acquisition of a content (webpage), an authentication of the game apparatus is performed, and a white list which records a domain name accessible by the game apparatus (the program guide program) is acquired from a managing server which is controlled by a provider of the television program guide. In the program guide program, it is determined whether or not a domain name described in URL of the webpage appears in the white list when a request to send the webpage is to be sent. If not appeared in the white list, the program guide program is suspended, and a web browser is activated to send the request to send the webpage.

16 Claims, 17 Drawing Sheets

INFORMATION PROCESSING SYSTEM, INFORMATION PROCESSING APPARATUS, STORAGE MEDIUM AND INFORMATION PROCESSING METHOD

CROSS REFERENCE OF RELATED APPLICATION

The disclosure of Japanese Patent Application No. 2012-252450 filed on Nov. 16, 2012 is incorporated herein by reference.

FIELD

This application describes an information processing system, information processing apparatus, storage medium and information processing method, receiving a provision of a specific service.

SUMMARY

It is a primary object of the present embodiment to provide a novel information processing system, information processing apparatus, storage medium and information processing method.

Another object of the present embodiment is to provide an information processing system, information processing apparatus, storage medium and information processing method, capable of controlling a safety or security of internet connection at a side of a content provider.

The other object of the present embodiment is to provide an information processing system, information processing apparatus, storage medium and information processing method, capable of accessing a server for which a safety or security is not guaranteed.

A first embodiment is an information processing system comprising a server which provides a specific service and an information processing apparatus which performs a predetermined application to receive a provision of the service. The information processing apparatus comprises a performing portion, a list acquiring portion and a determining portion. The performing portion is configured to perform the predetermined application. The list acquiring portion is configured to acquire a white list from a server controlled by a provider which provides the specific service. The determining portion is configured to determine, when a content for the specific service is to be requested, whether or not it is possible to access a server which provides the content in the predetermined application in accordance with the white list acquired by the list acquiring portion.

According to the first embodiment, since the white list is acquired from the server controlled by the provider which provides the specific service so as to determine whether or not the server is accessible, it is possible to control the safety or security of internet connection at a side of the provider of the content.

A second embodiment is according to the first embodiment, wherein the list acquiring portion is configured to acquire the white list when a performance of the predetermined application is started by the performing portion.

According to the second embodiment, it is possible to update a white list at every time that the predetermined application is performed.

A third embodiment is according to the first embodiment, wherein the information processing apparatus further comprises an authenticating portion configured to authenticate the information processing apparatus with an authenticating apparatus prior to acquisition of the white list.

According to the third embodiment, since the information processing apparatus is authenticated, only a regular or normal information processing apparatus can acquire a white list.

A fourth embodiment is according to the first embodiment, wherein the performing portion is configured to perform a further application different from the predetermined application when it is determined by the determining portion that it is impossible to access the server which provides the content, thereby to access the server which provides the content by the further application.

According to the fourth embodiment, even if a content cannot be acquired by the predetermined application, it is possible to acquire the content by the further application.

A fifth embodiment is according to the fourth embodiment, wherein the further application is a web browser.

According to the fifth embodiment, it is possible to acquire the content which cannot be acquired by the predetermined application with using the web browser.

A sixth embodiment is according to the fourth embodiment, wherein the performing portion is configured to suspend the performance of the predetermined application prior to the performance of the further application. It is to be noted that the predetermined application may be performed in a background.

According to the sixth embodiment, since the further application is performed after the predetermined application is suspended, it is possible to resume the predetermined application after the performance of the further application is terminated.

A seventh embodiment is according to the first embodiment, wherein the determining portion is configured to determine whether or not it is possible to access a provider of the content with using a white list in accessing the content displayed in the predetermined application.

According to the seventh embodiment, it is possible to determine whether or not it is accessible by the predetermined application in accessing the content as such a case where a webpage is to be acquired.

An eighth embodiment is according to the first embodiment, further comprising a terminal device capable of communicating with the information processing apparatus which further comprises a content acquiring portion configured to acquire the content and an outputting portion configured to output to the terminal device the content acquired by the content acquiring portion.

According to the eighth embodiment, since the content is acquired and the content is output to the terminal device capable of communicating with the information processing apparatus, it is possible to enjoy the acquired content on the terminal device.

A ninth embodiment is an information processing apparatus which performs a predetermined application to receive a provision of a service by a server which provides a specific service, and comprises a performing portion, a list acquiring portion and a determining portion. The performing portion is configured to perform the predetermined application. The list acquiring portion is configured to acquire a white list from a server controlled by a provider which provides the specific service. The determining portion is configured to determine, when a content for the specific service is to be requested, whether or not it is possible to access a server which provides the content in the predetermined application in accordance with the white list acquired by the list acquiring portion.

A tenth embodiment is a non-transitory computer readable storage medium storing an information processing program executable by a computer which performs a predetermined application to receive a provision of a service by a server which provides a specific service, wherein the information processing program causes the computer to function as: a performing portion configured to perform the predetermined application; a list acquiring portion configured to acquire a white list from a server controlled by a provider which provides the specific service; and a determining portion configured to determine, when a content for the specific service is to be requested, whether or not it is possible to access a server which provides the content in the predetermined application in accordance with the white list acquired by the list acquiring portion.

An eleventh embodiment is an information processing method by a computer which performs a predetermined application to receive a provision of a service by a server which provides a specific service, the computer performing steps of: (a) performing the predetermined application; (b) acquiring a white list from a server controlled by a provider which provides the specific service; and (c) determining, when a content for the specific service is to be requested, whether or not it is possible to access a server which provides the content in the predetermined application in accordance with the white list acquired in the step (b).

In the ninth to eleventh embodiments, as similar to the first embodiment, it is possible to control the safety or security of the internet connection at a side of the provider of the content.

The above described objects and other objects, features, aspects and advantages of the embodiments will become more apparent from the following detailed description when taken in conjunction with the accompanying drawings.

DETAILED DESCRIPTION OF NON-LIMITING EXAMPLE EMBODIMENTS

Figure 1:
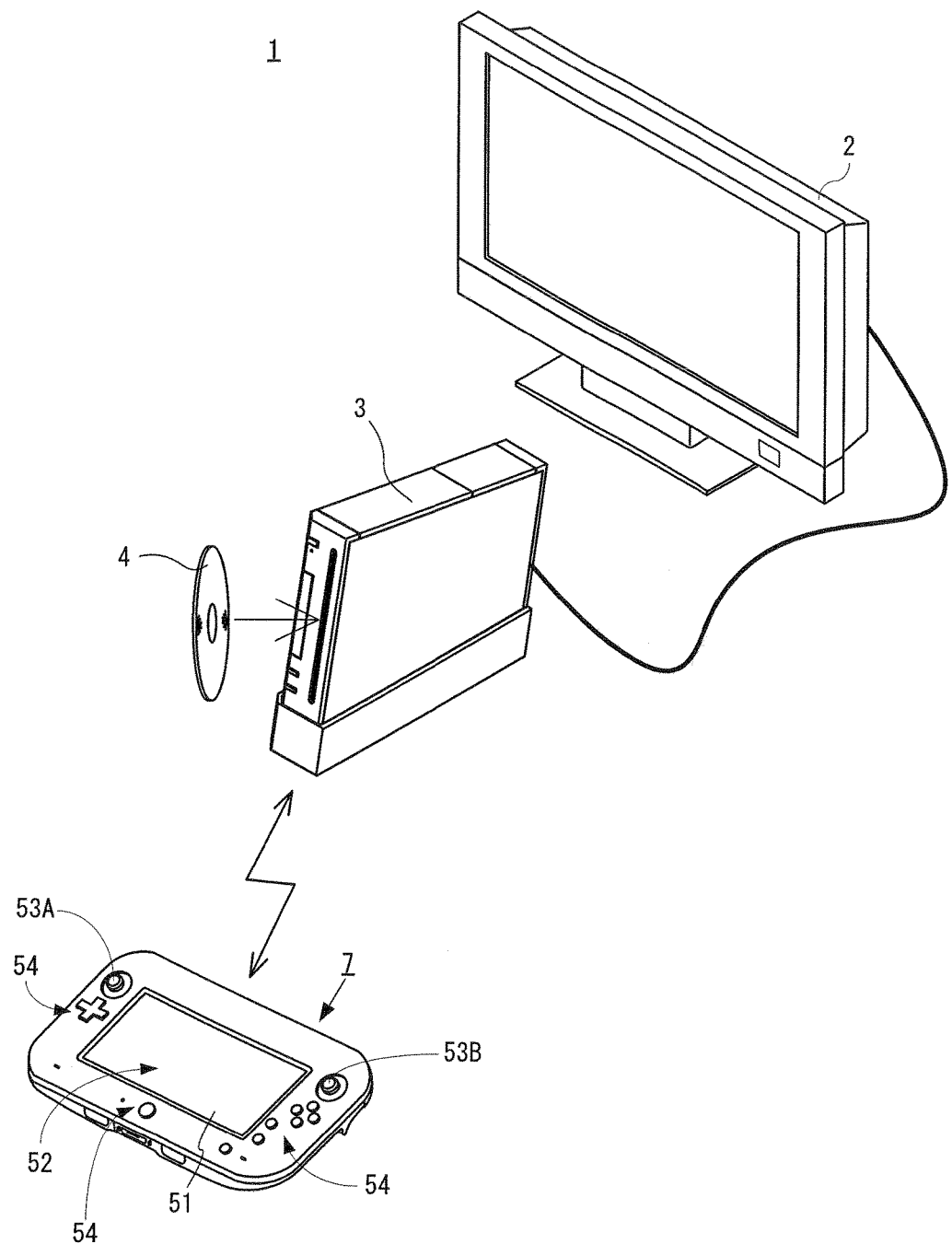
FIG. 1 is an appearance view of a non-limiting example game system.

A non-limiting example game system 1 is described with reference to drawings below. The game system 1 shown in FIG. 1 includes a stationary-type display device (hereinafter, referred to as "television") 2 typified by a television receiver or the like, a console-type game apparatus 3, an optical disk 4 and a terminal device 7. The game system 1 is for performing game processing in the game apparatus 3 based on game operations by using the terminal device 7, and displaying a game image obtained by the game processing on the television 2 and/or the terminal device 7.

Into the game apparatus 3, the optical disk 4 being one example of an information storage medium that is used to be replaceable with respect to the game apparatus 3 is detachably loaded. In the optical disk 4, an information processing program (typically, an application program such as a game program) to be executed in the game apparatus 3 is stored. The game apparatus 3 executes information processing (game processing) by reading and executing the information processing program stored in the optical disk 4 loaded into a loading slot provided on a front surface thereof.

To the game apparatus 3, the television 2 is connected via a connection cord. The television 2 displays a game image obtained through the game processing performed by the game apparatus 3. The television 2 has a speaker 2a (FIG. 2), and the speaker 2a outputs game sounds obtained as a result of the game processing described above.

Here, in another embodiment, the game apparatus 3 and the stationary-type display device may be integrally formed with each other. Furthermore, communications between the game apparatus 3 and the television 2 may be performed wirelessly.

The terminal device 7 sends and receives data with at least the game apparatus 3. The user (player) can use the terminal device 7 by moving it with his or her hands, and by placing the terminal device 7 at an arbitrary position. Although a detailed description will be made later, the terminal device 7 has a displaying means such as an LCD 51 and an inputting means such as a touch panel 52, analog sticks 53A and 53B and an operating button 54. The terminal device 7 can communicate with the game apparatus 3 through a wireless communication using a technique of Bluetooth (registered trademark), for example. However, the terminal device 7 and the game apparatus 3 may be connected to each other by a cable or wire. The terminal device 7 receives from the game apparatus 3 data of an image (game image, for example) produced in the game apparatus 3, and displays the image on the LCD 51. Furthermore, the terminal device 7 sends to the game apparatus 3 operation data indicating a content of the operation performed on the user's own device.

It should be noted that in this embodiment, an LCD is employed as a display device, but the terminal device 7 may include another arbitrary display device such as a display using EL (Electro Luminescence), for example.

Additionally, in FIG. 1, the number of terminal devices 7 included in the game system 1 is one, but the game apparatus 3 can communicate with a plurality of terminal devices 7, and a plurality of users can play a game by simultaneously using a predetermined number of the terminal devices 7.

Figure 2:
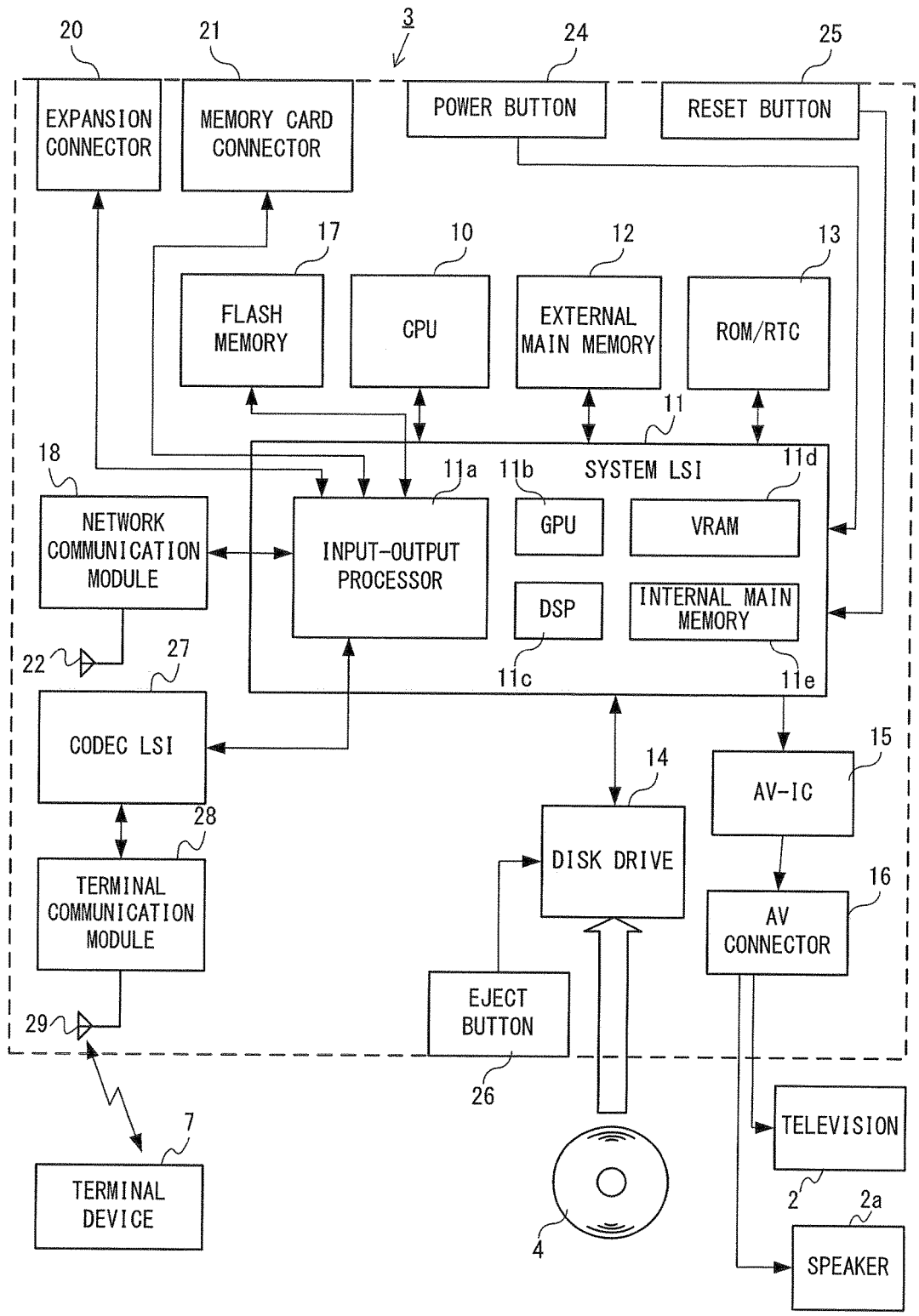
FIG. 2 is a block diagram showing a non-limiting example electric configuration of a game apparatus.

FIG. 2 is a block diagram showing a non-limiting example electric configuration of a game apparatus 3. The game apparatus 3 has a CPU 10, a system LSI 11, an external main memory 12, a ROM/RTC 13, a disk drive 14, an AV-IC 15, etc.

The CPU 10 is for executing game processing by executing the game program stored in the optical disk 4, and functions as a game processor. The CPU 10 is connected to the system LSI 11. The system LSI 11 is connected with the external main memory 12, the ROM/RTC 13, the disk drive 14 and the AV-IC 15 in addition to the CPU 10. The system LSI 11 performs processing of controlling data transfer between the respective components connected thereto, producing images to be displayed, acquiring data from external devices, and so on.

The external main memory 12 being volatile is for storing programs such as a game program read from the optical disk 4, a game program, etc. read from the flash memory 17, storing various data, and is utilized as a working area and a buffer area for the CPU 10. The ROM/RTC 13 has a ROM (so called a boot ROM) including a program for activating the game apparatus 3 and a clock circuit (RTC) for counting a time. The disk drive 14 reads program data, texture data, etc. from the optical disk 4, and writes the read data to an internal main memory 11e described later or the external main memory 12.

The system LSI 11 is provided with an input-output processor (I/O processor) 11a, a GPU 11b, a DSP 11c, a VRAM 11d, and the internal main memory 11e. Although illustration is omitted, these components 11a-11e are connected with each other by internal buses.

The GPU 11b configures a part of a depicting or drawing means, and produces image data according to a graphics command from the CPU 10. Here, data such as polygon data, texture data, etc. is stored in the VRAM 11d, and the GPU 11b generates the image data by using such the data. In this embodiment, the game apparatus 3 generates both of a game image to be displayed on the television 2 and a game image to be displayed on the terminal device 7. Hereinafter, the game image displayed on the television 2 may be called as "television game image", and the game image displayed on the terminal device 7 may be called as "terminal game image".

The DSP 11c functions as an audio processor, and generates sound data by using sound data and sound waveform (tone) data stored in the internal main memory 11e and the external main memory 12. In this embodiment, with respect to the game sound, as similar to the game image, both of a game sound to be output from the speaker of the television 2 and a game sound to be output from the speaker of the terminal device 7 are produced. Hereinafter, the game sound output from the television 2 may be called as "television game sound", and the game sound output from the terminal device 7 may be called as "terminal game sound".

As described above, data of images and sounds (including sound effects, game music, etc. This holds true below.) to be output to the television 2 out of the images and sounds produced in the game apparatus 3 are read by the AV-IC 15. The AV-IC 15 outputs the read image data to the television 2 via the AV connector 16, and outputs the read sound data to the speaker 2a integrated in the television 2. Thus, an image is displayed on the television 2 while a sound is output from the speaker 2a.

Also, data of images and sounds to be output by the terminal device 7 out of the images and sounds produced in the game apparatus 3 are sent to the terminal device 7 by the input-output processor 11a, etc. The data transmission to the terminal device 7 by the input-output processor 11a, etc. is described later.

The input-output processor 11a executes data transmission and reception with the components connected thereto, and executes downloading data from external devices. Also, the input-output processor 11a is connected to the flash memory 17, a network communication module 18, an expansion connector 20, a memory card connector 21, and a codec LSI 27. Furthermore, the network communication module 18 is connected with an antenna 22. The codec LSI 27 is connected to a terminal communication module 28, and the terminal communication module 28 is connected with an antenna 29.

The input-output processor 11a can be connected to networks like the Internet, etc. via the network communication module 18 and the antenna 22, and communicate with external information processing apparatuses (other game apparatuses, various servers and so on, for example) being connected to the network.

The input-output processor 11a periodically accesses the flash memory 17 to detect the presence or absence of data required to be sent to the network, and if the data is present, sends the data to the network via the network communication module 18 and the antenna 22.

Also, the input-output processor 11a receives data sent from external information processing apparatuses and data downloaded from a download server via the network, the antenna 22 and the network communication module 18, and stores the received data in the flash memory 17.

The CPU 10 executes the game program to thereby read the data stored in the flash memory 17 so as to use the data in the game program. In the flash memory 17, in addition to the data to be sent and received between the game apparatus 3 and the external information processing apparatuses, save data (result data or proceeding data of the game) of the game played by using the game apparatus 3 may be stored. Also, in the flash memory 17, the game program may be stored.

Also, the game apparatus 3 can send and receive data of images or videos, sounds audio, etc. to and from the terminal device 7. The input-output processor 11a outputs the data of the game image produced by the GPU 11b to the codec LSI 27 if sending the game image (terminal game image) to the terminal device 7. The codec LSI 27 performs predetermined compression processing on the image data from the input-output processor 11a. The terminal communication module 28 communicates with the terminal device 7 wirelessly. Accordingly, the image data compressed by the codec LSI 27 is sent to the terminal device 7 via the antenna 29 by the terminal communication module 28. In this embodiment, the codec LSI 27 compresses the image data by using efficient compression technique, such as H.264 standard, for example.

It should be noted that a compression technique except for it may be used, and the image data may be adapted to be sent without being compressed if the communication speed is high enough.

Furthermore, the terminal communication module 28 is a communication module for which the Wi-Fi certification is obtained, for example, and may use a MIMO (Multiple Input Multiple Output) technique employed in IEEE802.11n standard, for example, to thereby make high speed wireless communications with the terminal device 7, or may use other communication systems.

Furthermore, although a case where the game image is produced is described here, as one example, image data of applications other than a virtual game is likewise sent to the terminal device 7 after undergoing compression processing. The virtual game means computer games or video games played by operating characters, etc. appearing in the virtual space.

In addition, the game apparatus 3 sends sound data to the terminal device 7 besides the image data. That is, the input-output processor 11a outputs the sound data produced by the DSP 11c to the terminal communication module 28 via the codec LSI 27. In addition, the sound data may be acquired (downloaded) from an external source. The codec LSI 27 also performs the compression processing on the sound data, similar to the image data. The compression format of the sound data may be of any format. In another embodiment, the sound data may be sent without being compressed. The terminal communication module 28 sends the compressed image data and sound data to the terminal device 7 via the antenna 29.

Additionally, the game apparatus 3 can receive various data from the terminal device 7. Although the detail is described later, in this embodiment, the terminal device 7 sends operation data, image data, and sound data. Each data sent from the terminal device 7 is received by the terminal communication module 28 via the antenna 29. Here, the image data and the sound data from the terminal device 7 undergo compression processing similar to the image data and the sound data from the game apparatus 3 to the terminal device 7.

Accordingly, the image data and the sound data are sent from the terminal communication module 28 to the codec LSI 27, then undergo expansion processing by the codec LSI 27, and output to the input-output processor 11a.

In addition, the image data from the terminal device 7 includes image data corresponding to an image imaged by a camera not shown and so on, the sound data from the terminal device 7 includes sound data corresponding to sounds (voice, hand clapping, etc.) that is generated by the user and detected by a microphone 89 (see FIG. 3), and sounds from sound sources around the terminal device 7 (sound and music from the speaker 2a of the television 2).

On the other hand, the operation data from the terminal device 7, which has less data than images and sounds, may not be required to undergo the compression processing. Also, it may be encoded as required or may not be encoded. Accordingly, the operation data is received in the terminal communication module 28, and then output to the input-output processor 11a via the codec LSI 27. The input-output processor 11a stores (temporarily stores) the data received from the terminal device 7 in the buffer area of the internal main memory 11e or the external main memory 12.

Furthermore, the game apparatus 3 can be connected with another appliance and an external storage. That is, the input-output processor 11a is connected with the expansion connector 20 and the memory card connector 21. The expansion connector 20 is a connector for interfaces such as USB, SCSI. The expansion connector 20 can be connected with a medium such as an external storage and connected with peripheral devices of other controllers, etc., and can make communication with networks in place of the network communication module 18 by being connected with a wired connector for communication.

The memory card connector 21 is a connector for being connected with an external storage such as a memory card. For example, the input-output processor 11a can access the external storage via the expansion connector 20 and the memory card connector 21, and can store data in the external storage and read data from the external storage.

The game apparatus 3 is provided with a power button 24, a reset button 25, and an eject button 26. The power button 24 and the reset button 25 are connected to the system LSI 11. When the power button 24 is turned on, electric power is supplied to the respective components of the game apparatus 3 from an external power source by an AC adapter not shown. When the reset button 25 is pushed, the system LSI 11 restarts an activation program of the game apparatus 3. The eject button 26 is connected to the disk drive 14. When the eject button 26 is pushed, the optical disk 4 is ejected from the disk drive 14.

It should be noted that in another embodiment, some components contained in the game apparatus 3 may be configured as an expansion unit provided separately from the game apparatus 3. At this time, the expansion unit may be connected to the game apparatus 3 via the aforementioned expansion connector 20, for example.

Figure 3:
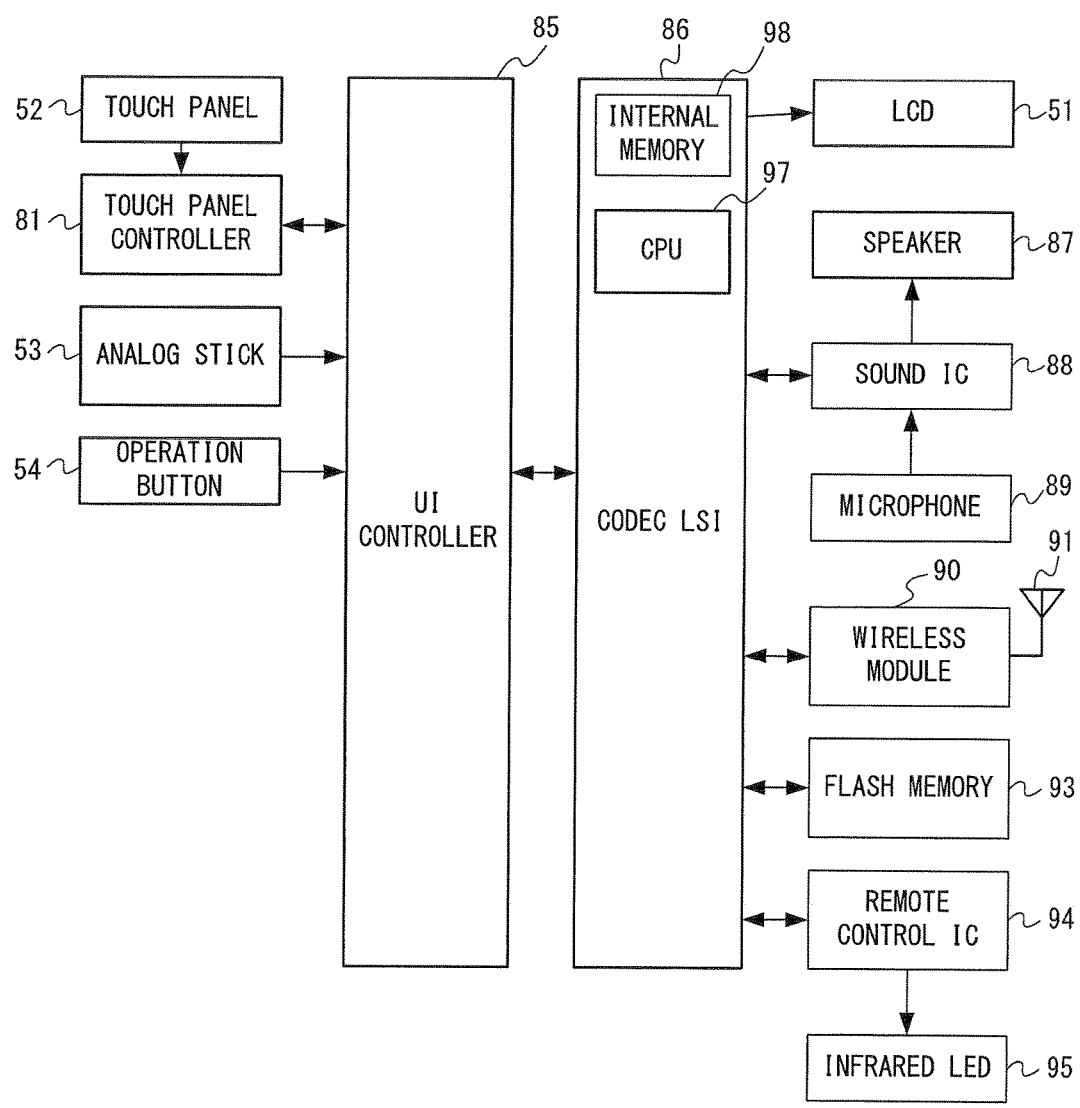
FIG. 3 is a block diagram showing a non-limiting example electric configuration of a terminal device.

FIG. 3 is a block diagram showing a non-limiting example electric configuration of the terminal device 7. As shown in FIG. 3, the terminal device 7 has a touch panel controller 81, a user interface controller (UI controller) 85, a codec LSI 86, the speaker 87, a sound IC 88, a microphone 89, a wireless module 90, an antenna 91, a flash memory 93, a remote control IC 94 and an infrared LED 95 besides the components shown in FIG. 1. These electronic components are mounted on an electronic circuit board and contained in the housing.

Although illustration is omitted, the terminal device 7 is supplied with power from an integrated battery or an external power source.

The UI controller 85 is a circuit for controlling an input and an output of data to and from various input-output portions. The UI controller 85 is connected with the touch panel controller 81, the analog stick 53 (analog sticks 53A and 53B), and the operation button 54. Also, the UI controller 85 is connected to the codec LSI 86.

The touch panel controller 81 is connected to the touch panel 52, and is a circuit for performing a control on the touch panel 52. The touch panel controller 81 generates touched position data in a predetermined format on the basis of a signal from the touch panel 52 and outputs it to the UI controller 85. The touched position data represents coordinates of the position (touched position) where a touch input (input operation) is made on an input surface of the touch panel 52.

In addition, the touch panel controller 81 performs reading the signals from the touch panel 52 and generation of touched position data at each predetermined time. Furthermore, from the UI controller 85 to the touch panel controller 81, various control instructions with respect to the touch panel 52 are output.

The analog stick 53 outputs stick data representing a direction in which the stick portion to be operated by the fingers of the user is slid (or tilted) and an amount of the sliding to the UI controller 85. Furthermore, the operation button 54 outputs operation button data representing an input status (whether to be pushed or not) with respect to each operation button (a cross button and various push buttons) to the UI controller 85.

The UI controller 85 outputs operation data including the touched position data, the stick data and the operation button data received from the respective components described above to the codec LSI 86.

The codec LSI 86 is a circuit for performing compression processing on data to be sent to the game apparatus 3 and expansion processing on the data sent from the game apparatus 3. The codec LSI 86 is connected with the LCD 51, the sound IC 88, the wireless module 90, the flash memory 93, and the remote control IC 94. Also, the codec LSI 86 includes a CPU 97 and an internal memory 98.

The terminal device 7 is adapted so as not to perform the game processing itself, but needs to execute a minimum program for management and communication of the terminal device 7. When the power is turned on, the CPU 97 reads the program stored in the flash memory 93 into the internal memory 98 and executes it to thereby activate the terminal device 7. Here, the terminal device 7 is activated and suspended on the basis of operation data from the game apparatus 3. It should be noted that in this embodiment, the suspension of the terminal device 7 means a sleep state in which power is supplied to a part of the circuit components (UI controller 85, codec LSI 86 and wireless module 90). In addition, a partial area of the internal memory 98 is used as a VRAM for the LCD 51.

The sound IC 88 is connected to the speaker 87 and the microphone 89, and is a circuit for controlling an input and output of sound data to and from the speaker 87 and the microphone 89. That is, in a case that sound data is received from the codec LSI 86, the sound IC 88 outputs a sound signal obtained by performing D/A conversion on the sound data to the speaker 87, to thereby make the speaker 87 output a sound. Also, the microphone 89 detects sound reaching or propagated to the terminal device 7, and outputs a sound signal indicating the sound to the sound IC 88. The sound IC 88 performs A/D conversion on the sound signal from the microphone 89, and outputs the sound data in the predetermined format to the codec LSI 86.

The codec LSI 86 sends to the game apparatus 3 the image data from the camera, the sound data from the microphone 89, and the operation data from the UI controller 85 via the wireless module 90. In this embodiment, the codec LSI 86 performs compression processing on the image data and the sound data similar to the codec LSI 27. The operation data and the compressed image data and sound data described above are output to the wireless module 90 as transmission data.

The wireless module 90 is connected with the antenna 91, and the wireless module 90 sends the aforementioned transmission data to the game apparatus 3 via the antenna 91. The wireless module 90 has a function similar to the terminal communication module 28 of the game apparatus 3. That is, the wireless module 90 has a function of connecting to the wireless LAN following the system based on the IEEE 802.11n standard, for example. The data to be sent may be encoded as required or may not be encoded.

A remote control IC 94 produces operation data (hereinafter, called as "remote control operation data") to be sent to the television 2 in accordance with predetermined sending format data. In addition, the predetermined sending format data is decided based on a kind (manufacturer, model, etc.) of the television 2. Although a detailed description will be omitted here, the predetermined sending format data is acquired from the game apparatus 3 to be stored in the flash memory 93, and in a case where the terminal device 7 functions as a remote control device for the television 2, the format data is read into the internal memory 98. Then, the remote control IC 94 outputs (sends) the remote control operation data produced in accordance with the predetermined format data from the infrared LED 95.

As described above, the terminal device 7 has the inputting means such as the touch panel 52, the analog stick 53, and the operation button 54, but may be adapted to have other inputting means in place of these inputting means, or with these inputting means in another embodiment. For example, as sensors for evaluating a motion (including a position and posture, or changes in the position and the posture) of the terminal device 7, at least one of a magnetic sensor, an acceleration sensor and a gyro sensor may be provided.

Additionally, the terminal device 7 is configured to have the camera and the microphone 89, but in another embodiment, it may not have the camera and the microphone 89, or may have either one of them.

For example, the above-described game apparatus 3 is stored with one or more application programs, and the game apparatus 3 can execute a selected one application program. In this embodiment, a case where a predetermined application program by which a provision of a specific service such as a television program guide can be received is executed will be described. Hereinafter, the application program for the television program guide may be called as "program guide program".

The television program guide is a service that provides a television program list for a week from a current time, for example. In addition, the television program list for a region or area a user selects is displayed. Data of the television program list is sent (distributed) from a predetermined server which provides a service of the television program guide in response to a request from the game apparatus 3 (program guide program).

The television program list is displayed on the LCD 51 of the terminal device 7, for example. Therefore, the user can see the television program list using the terminal device 7 while watching the television 2. Furthermore, by making the terminal device 7 function as a remote control device for the television 2, by using the terminal device 7, it is possible to change a channel of the television 2, adjust a sound volume of the speaker 2a, or perform an input change.

Although a detailed description is omitted here, the program guide program has a function of a browser placed at a utilization of World Wide Web (WWW) as similar to an application program for a web browser. Specifically, the program guide program is provided with functions for outputting a webpage on a screen, for tracing a hyperlink (link) and so on. Therefore, it is possible to change a time zone (including day and time) of the television program list, access a designated link that is set in a character string displayed in the television program list, keyword-search for a character string displayed in the television program list, and so on.

In addition, as examples of the web browser, there are popular web browsers such as Mozilla Firefox (registered trademark), Google Chrome (registered trademark), Internet Explorer (registered trademark), Opera (registered trademark), Safari (registered trademark), etc.

Furthermore, in the program guide program, in addition to a function of the web browser, a function different and independent from the function is added (implemented). It is to be noted that such an implemented function (expansion function) is controlled by using JavaScript (registered trademark) specifically expanded from a content that the web browser displays or processes or a specific HTML tag attribute.

Specifically, expansion functions such as (1) a program collation function based on a voice recognition, (2) a remote control operation function based on an infrared light transmission, (3) a depiction processing function for implementing expression that is difficult for the browser function, etc. are implemented.

(1) Program Collation Function Based on Voice Recognition

A voice output from the speaker 2a of the television 2 is detected by the microphone 89 of the terminal device 7, and voice data corresponding to a detected voice is recorded. The recorded voice data is sent to a predetermined server from the game apparatus 3, and collation is performed by the predetermined server, whereby a television program being watched can be specified. A result thereof is sent to the game apparatus 3 and in turn to the terminal device 7. Therefore, a screen showing a collation result (webpage) is displayed on the LCD 51 of the terminal device 7, and a voice showing the collation result is output from the speaker 87 of the terminal device 7.

(2) Remote Control Operation Function Based on Infrared Light Transmission

As described above, in a case where the terminal device 7 is made to function as a remote control device for the television 2, an infrared light signal (remote control operation data) is sent from the infrared LED 95 provided on the terminal device 7, whereby an operation for changing a channel of the television 2 or the like can be performed. A function for sending the remote control operation data and a function for setting the kind (manufacturer, model, etc.) of the television 2 are implemented as the expansion function.

(3) Depiction Processing Function Implementing Expression that is Difficult for Browser Function In a case where a smoothed animation or the like including transparency processing is to be displayed, it is necessary to perform depiction processing having a higher load. Therefore, as for depiction processing performing an expression that is difficult for the browser function such as the depiction processing having a heavier load, a part of the depiction processing is performed by using a depicting mechanism independent from a depicting mechanism of the web browser, whereby it becomes possible to implement rich expression impossible by the web browser only.

In addition, although three expansion functions provided in the program guide program are described here for simplification, the program guide program is provided with a number of expansion functions. In addition, a content and the number of pieces of the expansion functions may be arbitrarily set.

Figure 4:
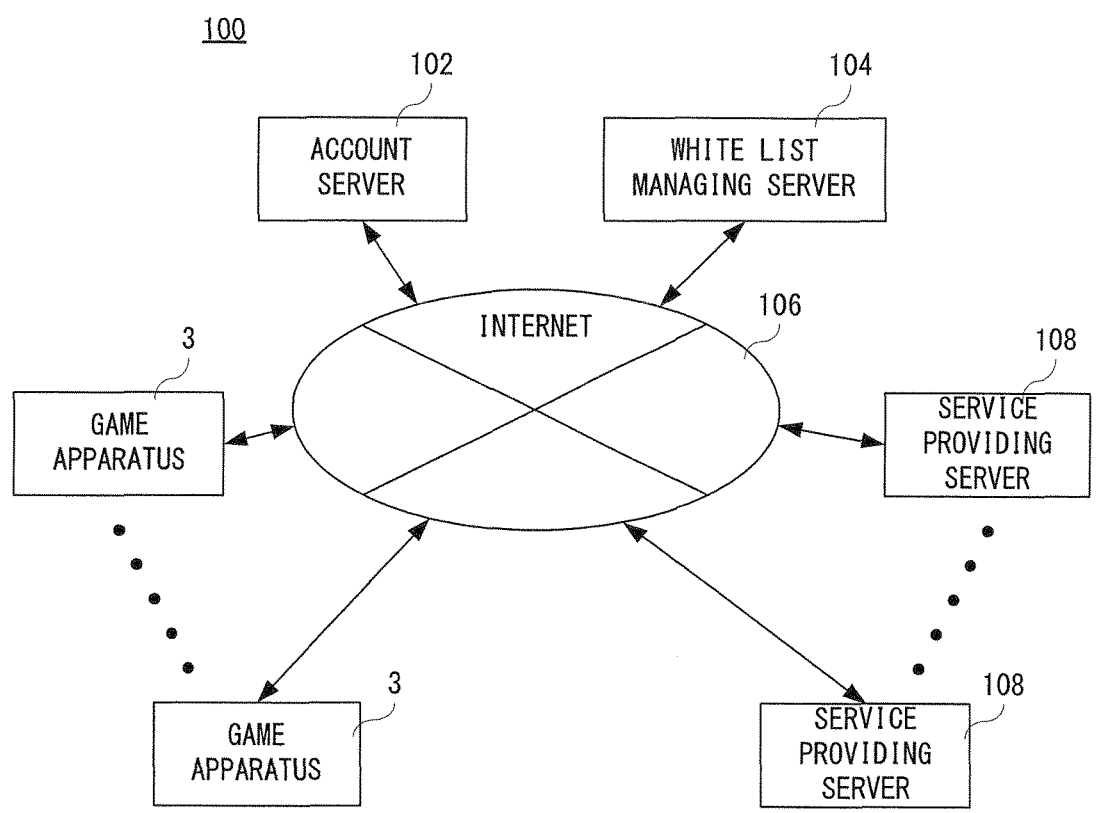
FIG. 4 is a view showing a non-limiting example network system utilizing the game apparatus shown in FIG. 1.

FIG. 4 is a view showing an example of a network system 100 using the above-described game apparatus 3. As shown in FIG. 4, the network system 100 includes an account server 102 and a white list managing server (hereinafter, simply called as "managing server") 104. Respective servers (102, 104) are connected to a plurality of game apparatuses 3 via the Internet 106. Furthermore, the Internet 106 is connected with servers each providing a specific service (hereinafter, called as "service providing server") in a plural number.

In addition, although a plurality of game apparatuses 3 are shown in the example of FIG. 4, at least one game apparatus 3 may be connected.

The account server 102 is a server for determining whether or not a game apparatus 3 accessing the account server 102 is regularly registered, and for issuing an electronic certificate (hereinafter, called as "service token") if and when the game apparatus 3 is regularly registered, thereby to send the same to the game apparatus 3. For example, identification information (device ID) assigned to each game apparatus 3 is registered in the account server 102, and the game apparatus 3 also sends the device ID of the game apparatus 3 itself when the game apparatus 3 sends a request to send the service token (service token sending request). The account server 102 determines whether or not the device ID sent from the game apparatus 3 is registered therein.

The managing server 104 is a server for managing a list (white list) recording identification information (domain name, in this embodiment) of an accessible server and for distributing a white list to a game apparatus 3 regularly registered in the account server 102 at a time that the game apparatus 3 acquires a content from an external terminal including a service providing server 108 via the Internet 106 by performing the program guide program. The managing server 104 is a server which is directly or indirectly controlled by a provider which provides a specific service such as the above-described television program guide. Therefore, in a case where the program guide program is to be executed, a white list which records a domain of the service providing server 108 accessible by the program guide program is controlled by a provider which provides a specific service, that is, a provider which provides a content in performing the specific service.

The service providing server 108 is a server for providing a specific service as described above. In this embodiment, the specific service includes not only the above-described television program guide but also various kinds of services such as a provision of a news and weather forecast, various kinds of search services, a search and displaying of a map, a translation, a search by a dictionary function, a time schedule search of a public transportation, a publicity and advertisement, an online shopping, an online banking, a distribution of images (still image, moving image). In addition, there is an occasion that a single service providing server 108 provides a plurality of services.

When a power of the game apparatus 3 is turned-on, for example, although not shown, a main menu screen is displayed. In the main menu screen, it is possible to select to perform any one of various kinds of applications stored in the game apparatus 3. In the following, a case where an application of the television program guide (program guide program) is selected to be performed in the main menu screen will be described.

Figure 5:
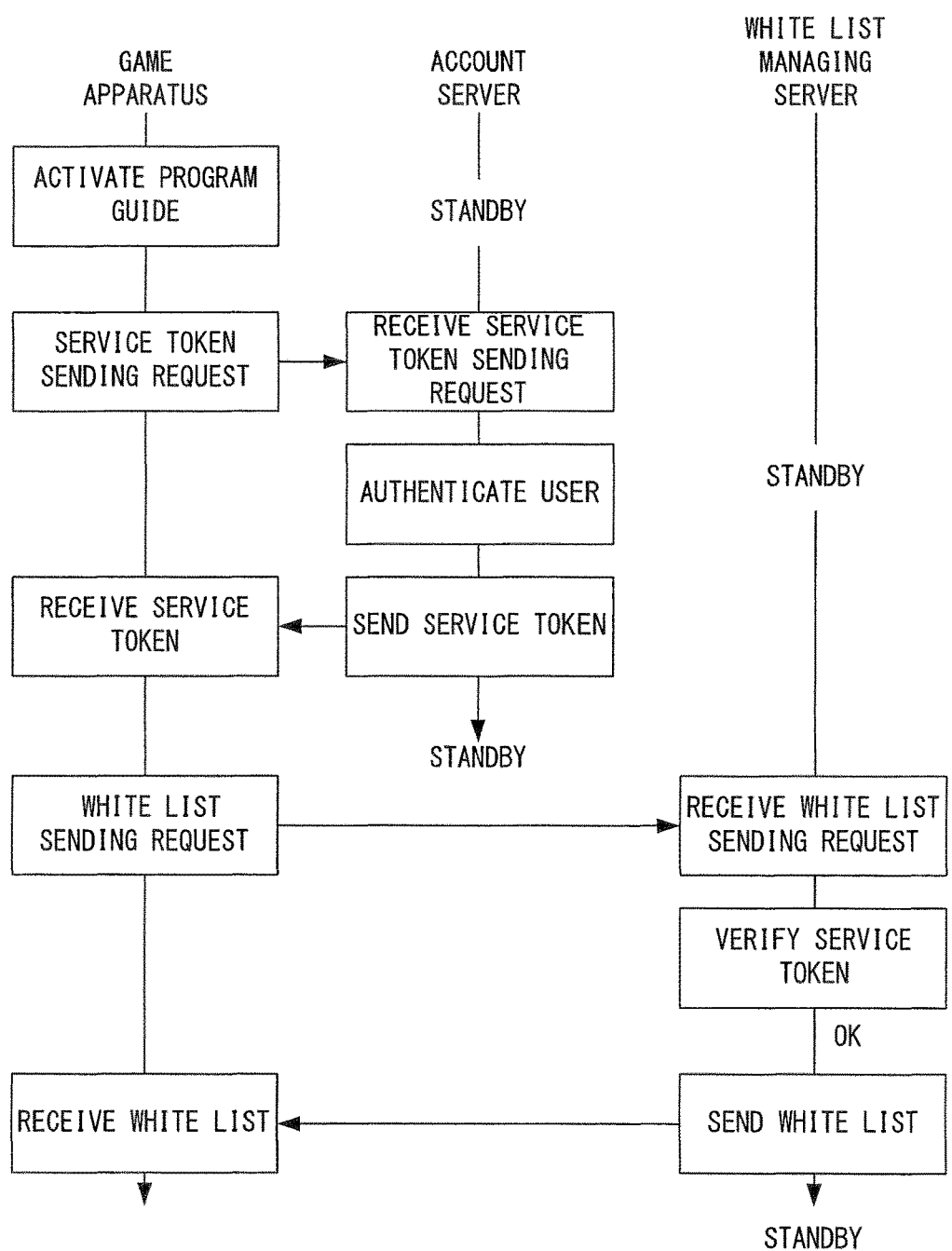
FIG. 5 is a view showing a non-limiting example part of a sequence of operations that the game apparatus acquires a content from a service providing server.

As shown in FIG. 5, when a program guide program is activated (started to be executed), prior to a request and displaying of a content, authentication processing and acquiring processing of a white list are performed. At first, the game apparatus 3 sends a service token sending request to the account server 102.

The account server 102 performs authentication (authentication processing) for requesting game apparatus 3 upon receipt of the service token sending request. As described above, the account server 102 authenticates whether or not the game apparatus 3 is regularly registered. In a case of a regularly registered game apparatus 3, the account server 102 sends data of a service token to the requesting game apparatus 3. Thereafter, the account server 102 returns to a standby state for receiving a service token sending request.

Although not shown, if the game apparatus 3 is not regularly registered, the account server 102 sends an error message that the requesting game apparatus 3 is not regularly registered to the requesting game apparatus 3.

If the game apparatus 3 receives the data of the service token, next, the game apparatus 3 sends a white list sending request to the managing server 104. At this time, the game apparatus 3 also sends the data of the service token previously acquired.

The managing server 104 inspects the service token if and when the managing server 104 receives the white list sending request together with the data of the service token. That is, it is confirmed whether or not a service token having a proper content is attached. In a case where the service token having a proper content is attached, the managing server 104 sends data of a white list to the requesting game apparatus 3. Then, the managing server 104 returns to a standby state for receiving a white list sending request.

In addition, in a case where data of the service token is not attached or a case where a content of the service token is not proper, the managing server 104 does not send the data of the white list to the requesting game apparatus 3.

Figure 6:
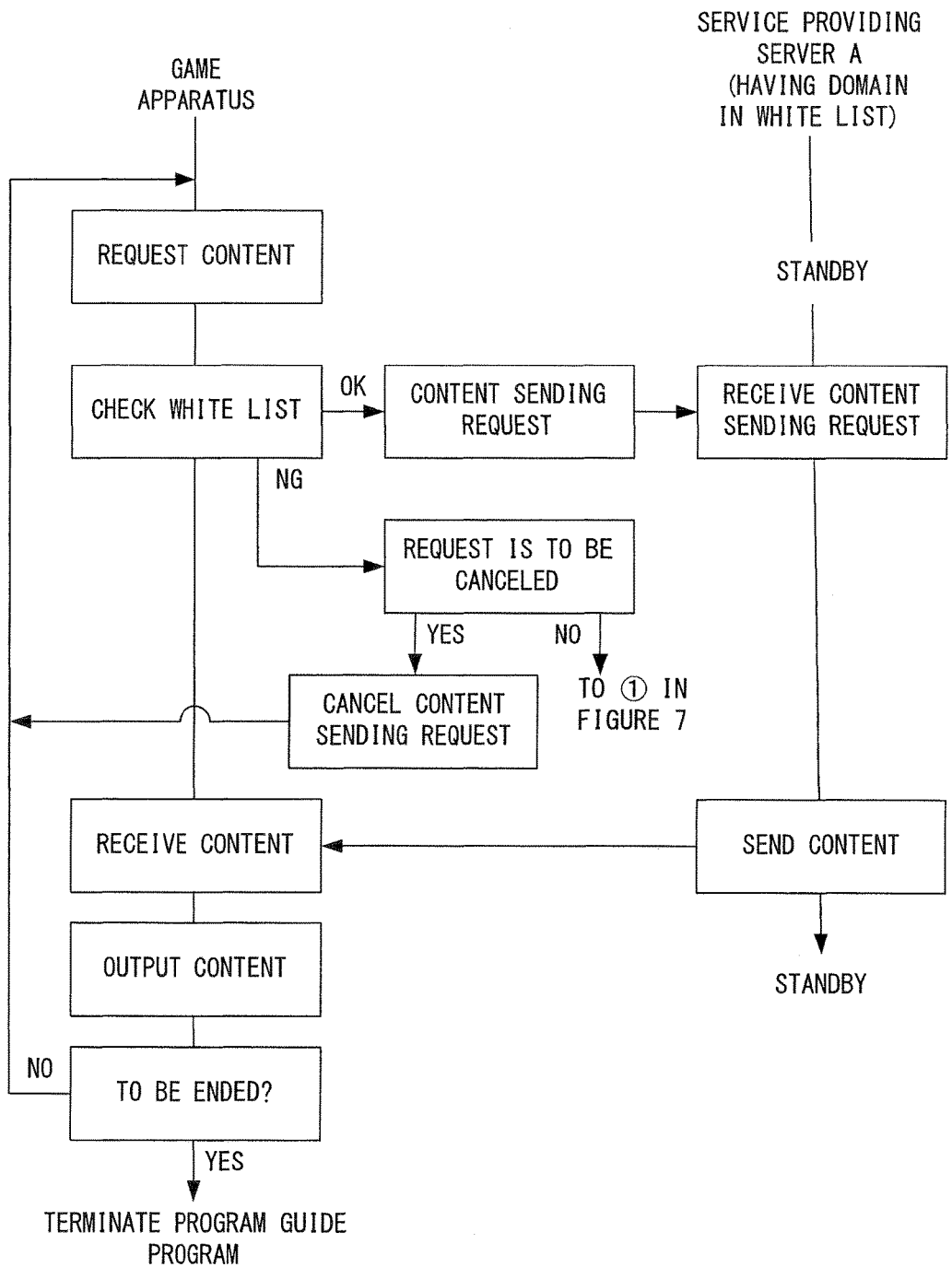
FIG. 6 is a view showing a non-limiting example further part of the sequence of operations that the game apparatus acquires the content from the service providing server, following FIG. 5.

The game apparatus 3 requests a content as shown in FIG. 6 upon receipt of the data of the white list. At a beginning that the program guide program is activated, a front page is automatically requested as a content; however, thereafter, a webpage shown by a link set in an icon or character string displayed on a webpage such as a front page or the like, a webpage for a result of a keyword search, etc. are requested in response to an input by a user.

If a content is requested, the game apparatus 3 checks the white list. In this embodiment, it is determined whether or not a domain name described in a URL for a requesting webpage is recorded in the white list. That is, it is determined whether or not it is possible to access the service providing server 108 which is a providing source (distributing source) of the requesting webpage.

In a case where a domain name described in the URL for the webpage is recorded in the white list, a sending request of a content shown by the URL, i.e. a content sending request is sent in accordance with the program guide program. Then, a predetermined service providing server 108 (here, called as "service providing server A") receives the content sending request. In addition, the service providing server A is a server (computer) shown by the domain name (there is an occasion that a host name is included) described in the above-described URL.

The service providing server A sends a content (here, source data of a webpage) to the requesting game apparatus 3 upon receipt of the content sending request. The game apparatus 3 receives a content and outputs the content. Specifically, the program guide program analyzes source data of the webpage, and puts the analyzed data in order, and produces image data for the webpage. Then, the game apparatus 3 sends the produced image data to the terminal device 7. Therefore, a webpage of the television program guide is displayed on the LCD 51 of the terminal device 7.

On the other hand, in a case where a domain name described in the URL for the webpage is not recorded in the white list, a user is inquired on whether or not the content request is to be canceled. For example, the game apparatus 3 sends to the terminal device 7 image data for an inquiry screen for inquiring whether or not the content request is to be canceled. If the user selects to cancel the content request with using the terminal device 7, the content request is canceled, and processing of the program guide program is continued.

Figure 7:
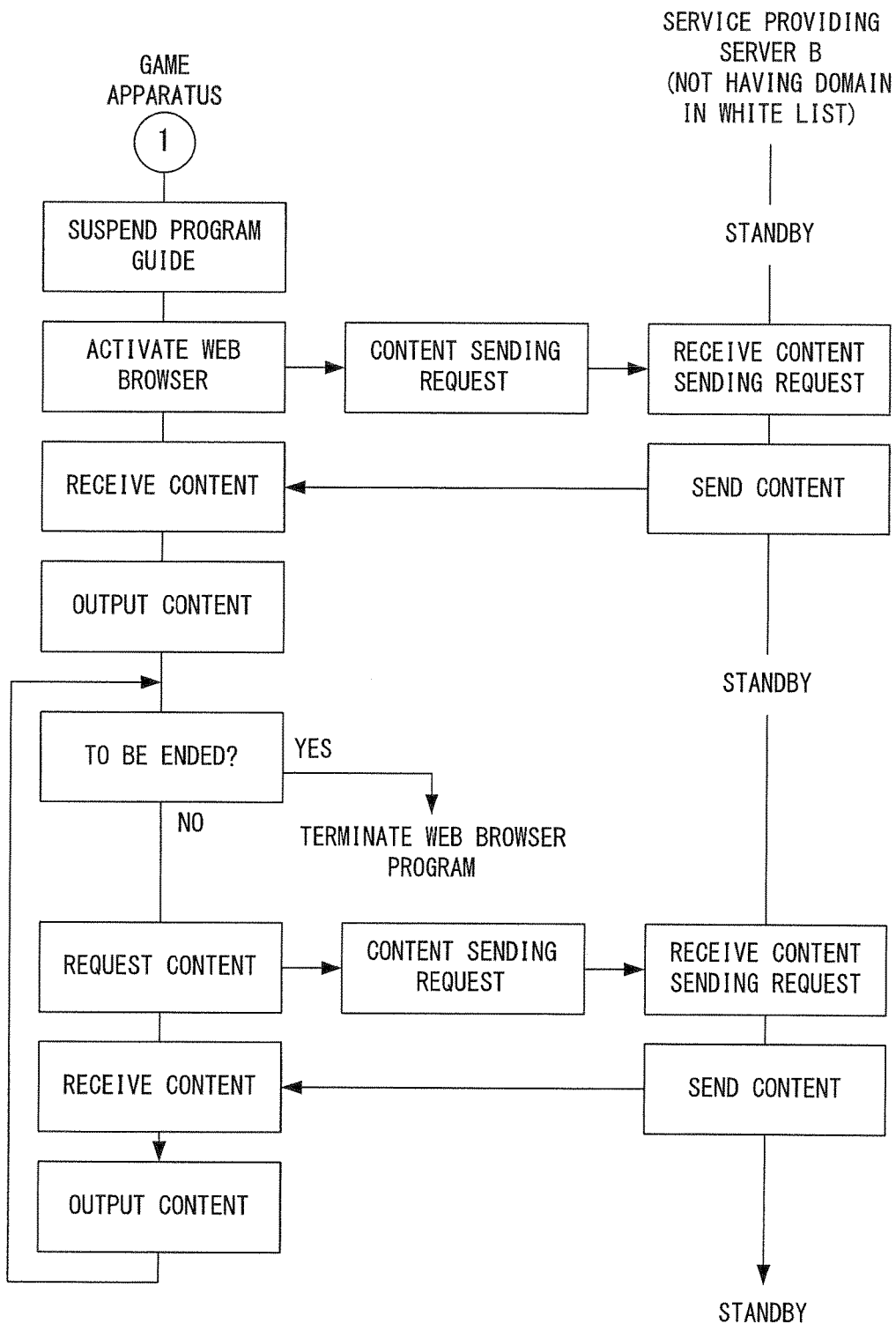
FIG. 7 is a view showing a non-limiting example still further part of the sequence of operations that the game apparatus acquires the content from the service providing server, branching at a midway of FIG. 6.

On the other hand, if the user selects not to cancel the content request, as shown in FIG. 7, in the game apparatus 3, the program guide program is suspended (temporarily stopped). Then, a web browser is activated, and a content sending request is sent by the web browser. Then, a predetermined service providing server 108 (here, called as "service providing server B") receives the content sending request. In addition, the service providing server B is a computer shown by a domain name (there is an occasion that a host name is included) described in the above-described URL.

More specifically, the game apparatus 3 is also stored with an application program of a web browser (hereinafter, may be called as "browser program"). The web browser stored in the game apparatus 3 is an application program developed to be used in the game apparatus 3 and terminal device 7, and having a function the same or similar to that of the above-described popular web browser.

The service providing server B sends a content (here, source data of a webpage as described above) to the requesting game apparatus 3 upon receipt of the content sending request. The game apparatus 3 receives a content and outputs the content. Specifically, the browser program analyzes source data of the webpage, and puts the analyzed data in order, and produces image data for the webpage. Then, the game apparatus 3 sends the produced image data to the terminal device 7. Therefore, an image corresponding to image data produced by the web browser is displayed on the LCD 51 of the terminal device 7. That is, by accessing the service providing server 108 a domain name of which is not recorded in the white list, it is possible to acquire the source data (content) of the webpage from the service providing server 108.

Thereafter, until the browser program is terminated, if there is a request of a content, a content sending request is sent according to the browser program. Then, the service providing server B receives the content sending request. Upon receipt of the content sending request, the service providing server B sends a content requested to the requesting game apparatus 3. The game apparatus 3 receives the content and outputs the content.

Although not shown, if the browser program is terminated, the program guide program being suspended is resumed.

Thus, in a case where a domain name described in the URL for the webpage is not recorded in the white list, if the user selects not to cancel the request of the content, the program guide program is suspended, and a web browser is activated to acquire the webpage. Accordingly, since the web browser does not have an expansion function such as a program guide program, a risk caused by unjust use of an expansion function can be avoided.

In addition, in general, since a domain name described in the URL for the front page is recorded in the white list, it is difficult to consider that a front page displayed at a time of activation of the program guide program is not acquired from the service providing server A which provides a specific service (television program guide); however, since there may be an occasion that the program guide program is unjustly changed or altered, even in a case where the front page is acquired, a check is performed with using a white list.

Figure 8:
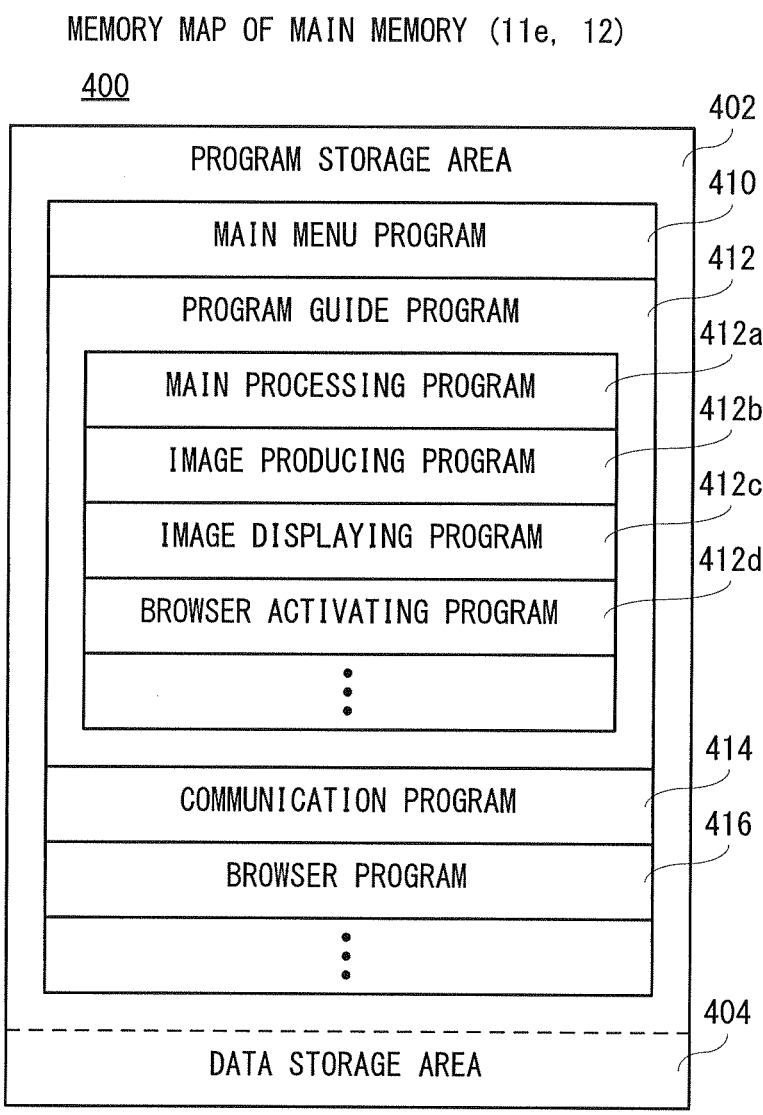
FIG. 8 is a view showing a non-limiting example memory map of a main memory shown in FIG. 2.

FIG. 8 shows an example of a memory map 400 of the main memory (11*e*, 12) of the game apparatus 3 shown in FIG. 2. As shown in FIG. 8, the main memory (11*e*, 12) includes a program storage area 402 and a data storage area 404. The program storage area 402 is stored with an information processing program or the like such as a predetermined application program (in this embodiment, a program guide program 412). For example, the information processing program or the like is partly or wholly read from the flash memory 17 incorporated within the game apparatus 3 or the optical disk 4 inserted to the disk drive 14, and stored in the main memory (11e, 12).

In addition, the information processing program or the like may be acquired from an external device of the game apparatus 3 (via the Internet 106), for example. Furthermore, as for the information processing program or the like read from the optical disk 4 or acquired from the external device, a part of a program may be stored in advance within the game apparatus 3.

In this embodiment, the program storage area 402 is stored with a main menu program 410, a program guide program 412, a communication program 414, a browser program 416, etc.

The main menu program 410 is a program for displaying a main menu screen and for performing an application selected in the main menu. For example, in the main menu screen, it is possible to select an execution of the program guide program 412, the browser program 416 or another application program such as a virtual game (excluding the browser program 416. The same is true hereinafter).

The program guide program 412 is constituted by a main processing program 412a, an image producing program 412b, an image displaying program 412c, a browser activating program 412d, etc.

The main processing program 412a is a program for processing a main routine of the program guide program 412. The image producing program 412b is a program for producing image data of a webpage by analyzing source data of the received webpage and putting the analyzed data in order. The image displaying program 412c is a program for sending image data produced in accordance with the image producing program 412b to the terminal device 7. In addition, as described above, compression processing is applied to the image data to be sent to the terminal device 7. Furthermore, in some cases, the image displaying program 412c sends (outputs) the image data to the television 2. In such a case, a webpage corresponding to the image data is displayed on the television 2. The browser activating program 412d is a program for instructing an activation of an application program of the web browser (browser program 416).

Although not shown, the program guide program 412 is also stored with a program for the above-described expansion function.

A communication program 414 is a program for communicating with a computer (including another game apparatus 3) and the server (102, 104, 108, etc.) via a network such as the Internet 106. The browser program 416 is, as described above, an application program of the web browser for the game apparatus 3 and the terminal device 7.

In addition, the program storage area 402 is further stored with a voice producing program, a voice outputting program, a backup program, etc.

Figure 9:
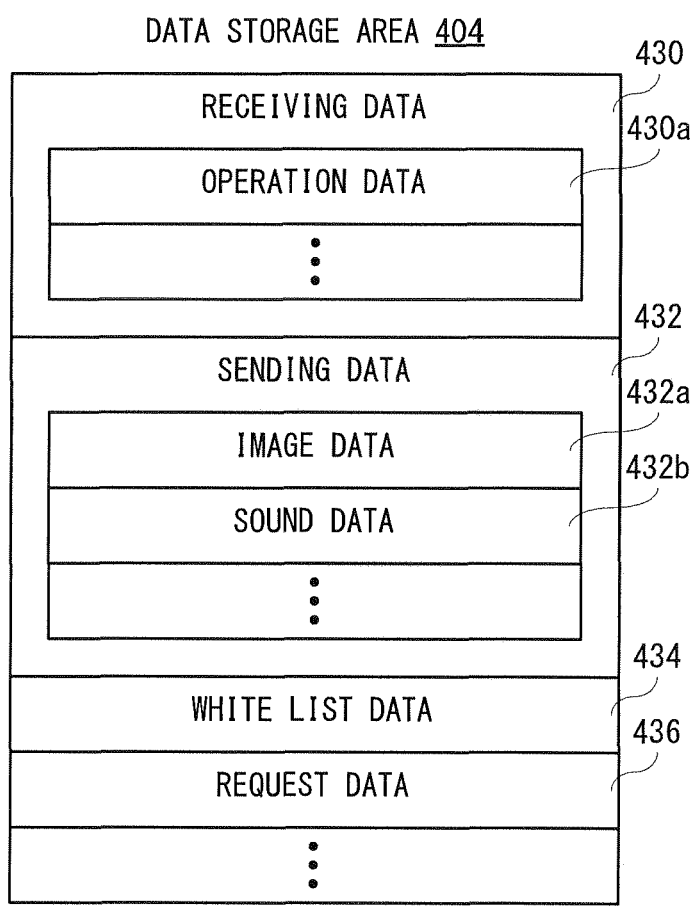
FIG. 9 is a view showing a specific content of a data storage area shown in FIG. 8.

As shown in FIG. 9, the data storage area 404 is stored with receiving data 430, sending data 432, white list data 434, request data 436, etc.

The receiving data 430 is various kinds of data received from the terminal device 7. The receiving data 430 includes operation data 430a. In a case where the terminal device 7 is connected to the game apparatus 3 in a plural number, the operation data 430a is stored in a plural number corresponding to each terminal device 7.

The operation data 430a is data representing an operation of the user to the terminal device 7, and as described above, includes operating button data, stick data and touch position data; however, the operation data 430a should be data representative of an operation by the user who operates the terminal device 7, and may be data including any one of the above-described data. The operation data 430a is sent from the terminal device 7, received by the game apparatus 3, and stored in the main memory (11e, 12).

In addition, in the main memory (11e, 12), a predetermined number of operation data may be stored from the newest data (data acquired at the last) sequentially.

The sending data 432 includes image data 432a, voice data 432b, etc. The image data 432a is produced through the processing by the program guide program 412 (also including the browser program 416), and includes image data of game image (in this embodiment, the webpage) for the terminal device output from the terminal device 7, etc. The voice data 432b is produced by the processing by the program guide program 412 (also including the browser program 416) and includes voice data of a game voice for the terminal device and voice data for the BGM and sound effect output from the terminal device 7.

The white list data 434 is data of a white list acquired (downloaded) from the managing server 104, and stored (updated) at every time that the program guide program 412 is executed.

The request data 436 is data (URL data) for the content (webpage) requested by activating the web browser while the program guide program 412 is suspended.

Although not shown, the data storage area 404 is stored with other data, or provided with other flags and counters (timers).

Figure 10:
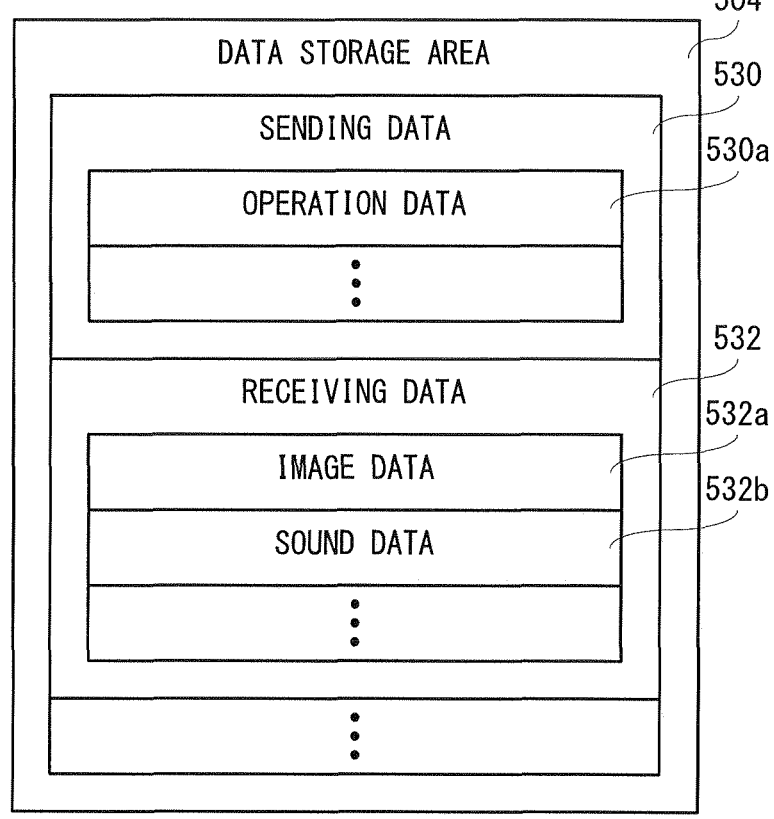
FIG. 10 is a view showing a non-limiting example memory map of an internal memory shown in FIG. 3.

FIG. 10 shows one example of a memory map 500 of the internal memory 98 of the terminal device 7 shown in FIG. 3. As shown in FIG. 10, the internal memory 98 includes a data storage area 504.

The data storage area 504 is stored with sending data 530, receiving data 532, etc. The sending data 530 includes operation data 530a. The operation data 530a is the same as the operation data 430a included in the above-described receiving data 430, and therefore, a duplicate description is omitted here. Similarly, the receiving data 532 includes image data 532a, voice data 532b, etc. These data are also the same as the image data 432a and the voice data 432b included in the above-described sending data 432, and therefore, a duplicate description is omitted here.

Figure 11:
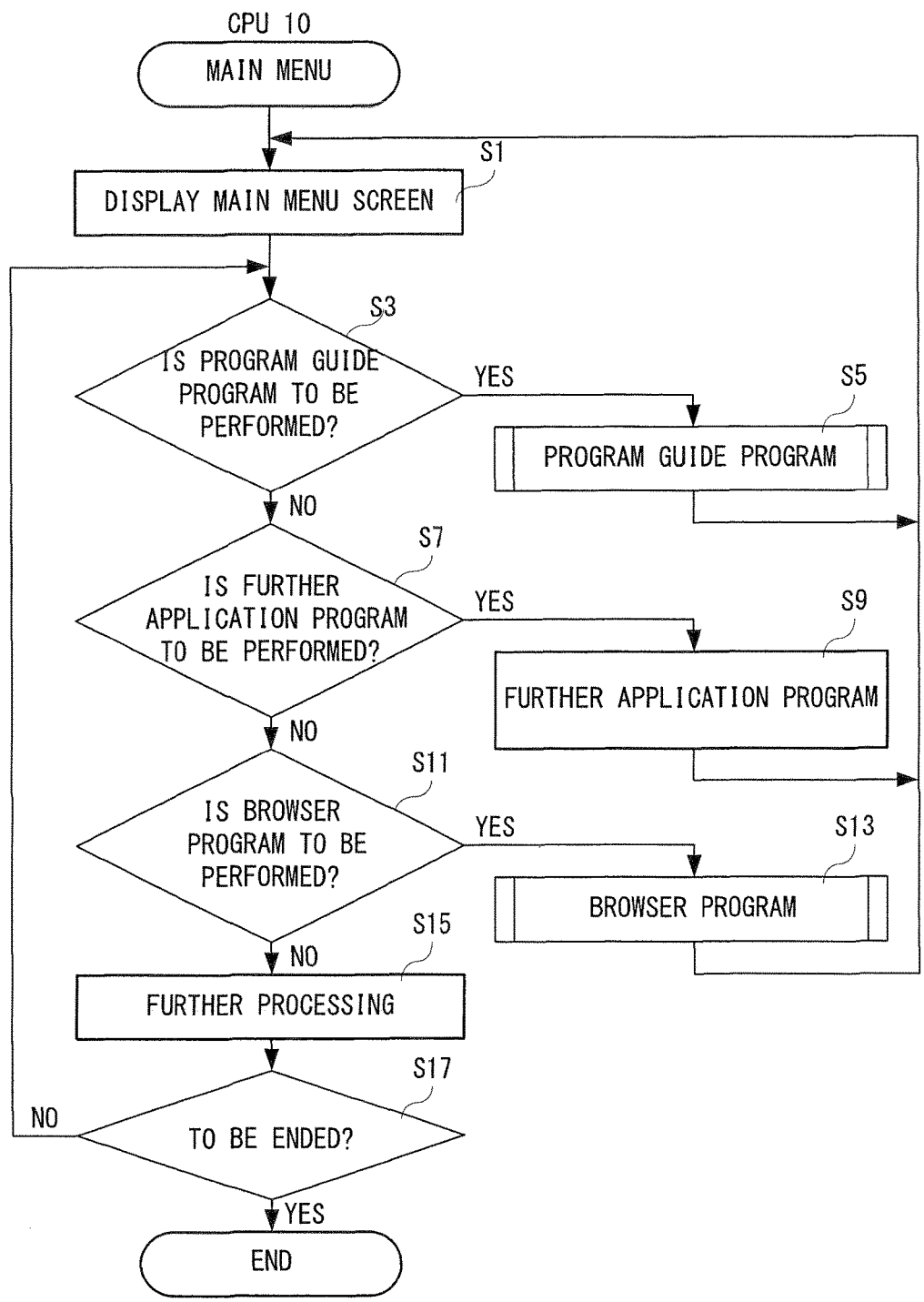
FIG. 11 is a flowchart showing a non-limiting example main menu process of a CPU of the game apparatus shown in FIG. 2.

FIG. 11 is a flowchart showing the main menu processing by the CPU 10 provided in the game apparatus 3 shown in FIG. 2. When a power of the game apparatus 3 is turned-on, prior to a performance of the main menu processing, the CPU 10 executes a boot program stored in a boot ROM not shown, whereby respective units such as the main memory (11e, 12) and so on can be initialized. Then, the main menu program 410, the program guide program (information processing program 412), the communication program 414 and the browser program 416 all stored in the optical disk 4 or the flash memory 17 are read into the main memory (11e, 12), and the execution of the main menu program 410 is started by the CPU 10. In addition, the programs other than the main menu program 410 may be read into the main memory (11e, 12) as necessary.

In addition, the processing in respective steps of the flowchart shown in FIG. 11 (the same is true for FIG. 12 to FIG. 17 described later) are only examples, and therefore, as far as the same or similar results can be obtained, a processing order of the respective steps may be exchanged.

Furthermore, this embodiment is described on an assumption that the processing of the respective steps in flowcharts shown in FIG. 11 to FIG. 17 are basically performed by the CPU 10; however, a part of the steps may be performed by a processor(s) and a dedicated circuit(s) other than the CPU 10.

As shown in FIG. 11, when the main menu processing is started, the CPU 10 displays the main menu screen in a step S1. Although a detailed description is omitted here, the main menu screen is displayed on at least one of the television 2 and the LCD 51 of the terminal device 7.

In a step S3, it is determined whether or not the program guide program 412 is to be executed. That is, the CPU 10 determines whether or not an execution of the program guide program 412 is instructed in the main menu screen. If "YES" is determined in the step S3, that is, if the program guide program 412 is to be executed, in a step S5, the CPU 10 performs the processing (see FIG. 12 and FIG. 13) of the program guide program 412 described later, and then, the process returns to the step S1.

On the other hand, if "NO" is determined in the step S3, that is, the program guide program 412 is not to be executed, in a step S7, it is determined whether or not a further application program such as a virtual game is to be executed. That is, in the main menu screen, the CPU 10 determines whether or not a performance of a further application such as a virtual game is instructed.

If "YES" is determined in the step S7, that is, if the further application program is to be executed, the processing of the further application is performed in a step S9, and then, the process returns to the step S1. On the other hand, if "NO" is determined in the step S7, that is, if the further application program is not to be executed, in a step S11, it is determined whether or not the browser program 416 is to be executed. That is, the CPU 10 determines, in the main menu screen, whether or not an execution of the browser program 416 is instructed by a user, or whether or not an execution of the browser program 416 is instructed by the program guide program 412.

If "YES" is determined in the step S11, the process returns to the step S1 after the processing (see FIG. 16 and FIG. 17) of the browser program 416 is executed. On the other hand, if "NO" is determined in the step S11, that is, the browser program 416 is not to be executed, in a step S15, further processing that a cursor is moved in the main menu screen or the like is performed.

Then, in a step S17, it is determined whether or not the processing is to be ended. For example, it is determined whether or not there is an instruction for turning-off the power of the game apparatus 3. If "NO" is determined in the step S17, that is, if not to be ended, the process returns to the step S3 with no action. On the other hand, if "YES" is determined in the step S17, that is, if to be ended, the main menu processing is terminated.

In addition, although not shown, as described later, in a case where an execution (activation) of the browser program 416 is instructed in the processing of the program guide program 412, if the processing of the program guide program 412 is suspended, the main menu is not displayed, and the processing of the browser program 416 is started.

Figure 12:
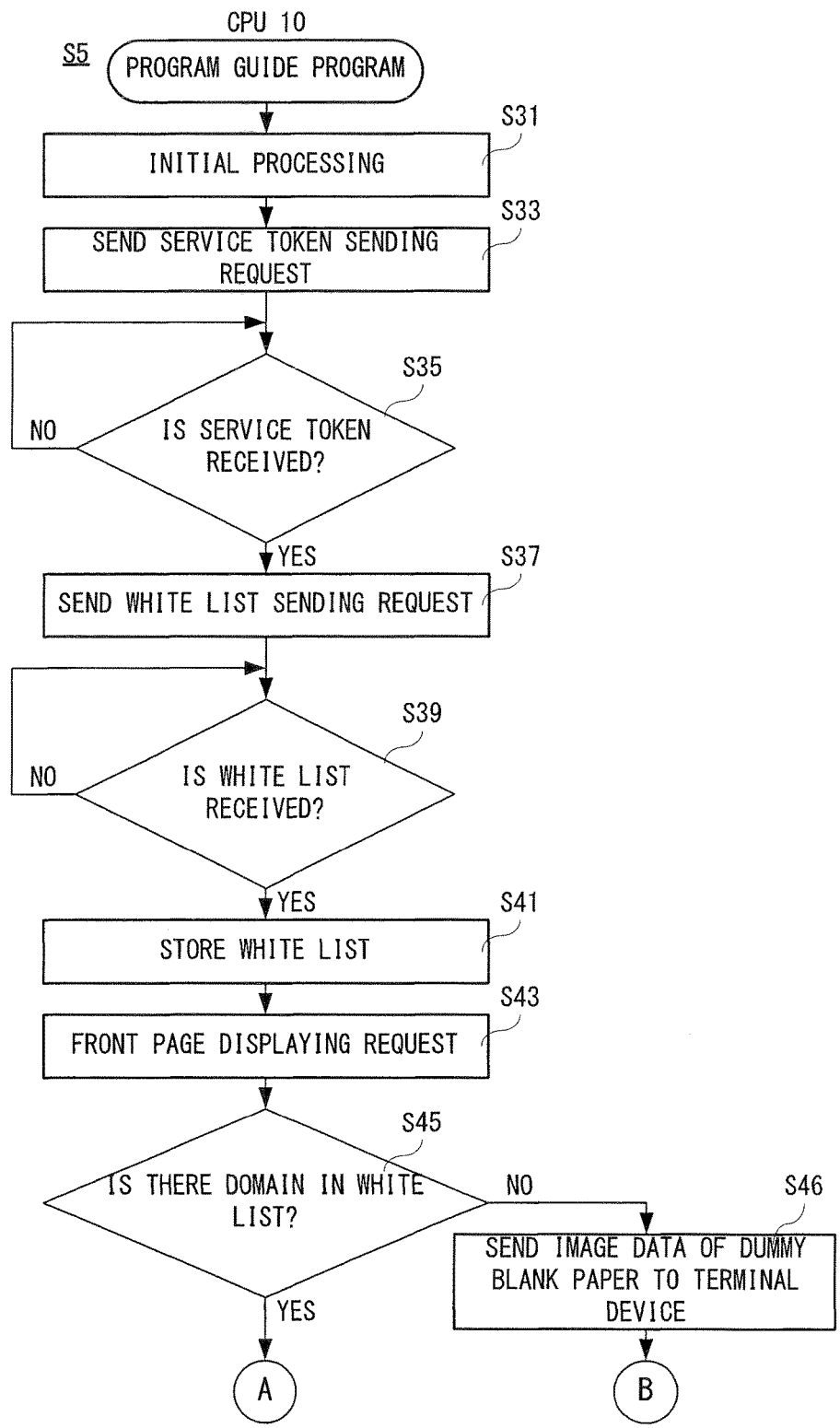
FIG. 12 is a flowchart showing a non-limiting example part of processing of a program guide program by the CPU of the game apparatus shown in FIG. 2.
Figure 13:
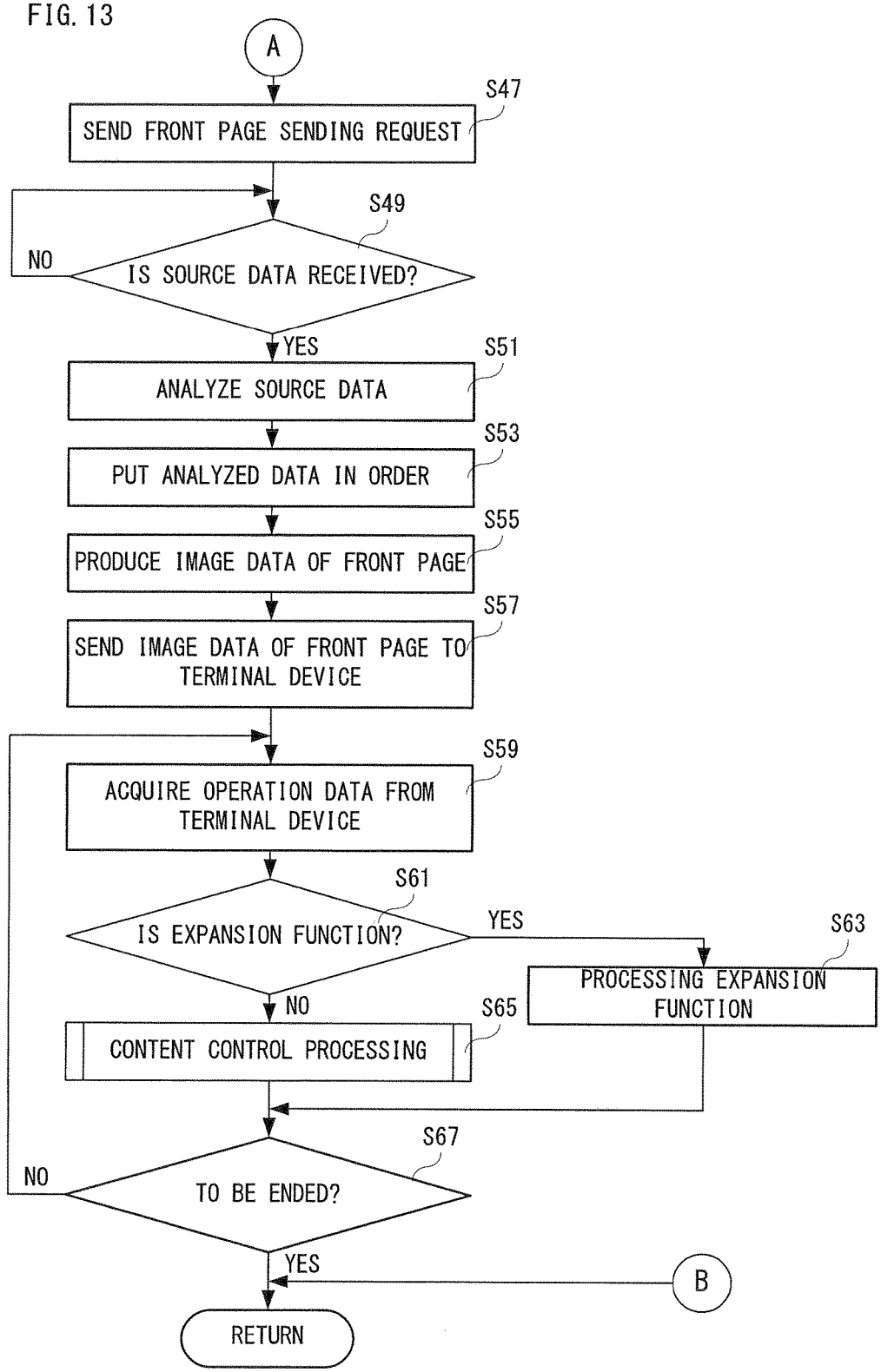
FIG. 13 is a flowchart showing a non-limiting example further part of the processing of a program guide program by the CPU of the game apparatus shown in FIG. 2, following FIG. 12.

FIG. 12 and FIG. 13 show flowcharts of the processing of the program guide program 412 in the step S5 shown in FIG. 11. As shown in FIG. 12, the CPU 10 performs initial processing in a step S31 upon start of the processing of the program guide program 412. In the initial processing, producing processing for a main window (not shown) of the program guide program 412 is executed, and so on.

In a next step S33, a service token sending request (a request to send a service token) is sent to the account server 102. At this time, a device ID of the game apparatus 3 is also sent. The account server 102 performs authentication processing upon receipt of the service token sending request, and if the game apparatus 3 is a game apparatus regularly registered, the account server 102 sends data of the service token to the requesting game apparatus 3.

Returning to FIG. 12, in a step S35, it is determined whether or not the service token data is received. If "NO" is determined in the step S35, that is, if the service token data is not received, the process returns to the same step S35.

In addition, in an example shown in FIG. 12, in a case where "NO" is determined in the step S35, the process returns to the same step S35; however, in fact, in a case where the requesting game apparatus fails in reception (acquisition) of the service token due to a time over, for example, the program guide program 412 is terminated. This is true for a case where it is determined whether or not data of the white list and source data are received (acquired) (S39, S49, S99) described later.

On the other hand, if "YES" is determined in the step S35, that is, if the service token data is received, in a step S37, the CPU 10 sends a white list sending request (a request to send a white list) to the managing server 104. At this time, the data of the service token is also sent. The managing server 104 inspects the service token if and when the white list sending request is received together with the service token data, and in a case where the content of the service token is correct, the managing server 104 sends the data of white list to the requesting game apparatus 3.

Returning to FIG. 12, in a step S39, it is determined whether or not the data of the white list is received. If "NO" is determined in the step S39, that is, if the data of the white list is not received, the process returns to the step S39 with no action. On the other hand, if "YES" is determined in the step S39, that is, if the data of the white list is received, in a step S41, the received data of the white list is stored. That is, the white list data 434 is stored (updated).

In a succeeding step S43, the CPU 10 requests to display a front page for the program guide program 412. Then, in a step S45, it is determined whether or not a domain name is recorded in the white list. In addition, a domain name is data described in the URL for acquiring the front page.

If "NO" is determined in the step S45, that is, if a domain name is not recorded in the white list, in a step S46, after image data of a dummy blank paper is sent to the terminal device 7, as shown in FIG. 13, the processing of the program guide program 412 is terminated, and then, the process returns to the processing of the main menu shown in FIG. 11. On the other hand, if "YES" is determined in the step S45, that is, if the domain name is recorded in the white list, in a step S47 shown in FIG. 13, a front page sending request is sent. Here, the CPU 10 sends the front page sending request to the service providing server 108 according to the URL set in the front page. Therefore, the service providing server 108 which receives the front page sending request sends the source data for the front page to the requesting game apparatus 3.

Returning to FIG. 13, in a step S49, it is determined whether or not the source data is received. If "NO" is determined in the step S49, that is, if no source data is received, the process returns to the same step S49. On the other hand, if "YES" is determined in the step S49, that is, if the source data is received, the source data is analyzed in the step S51, and the analyzed data is put in order in a step S53, and image data of the front page is produced in a step S55.

Then, in a step S57, the image data of the front page is sent to the terminal device 7. Specifically describing, the front page image data produced is sent to the codec LSI 27 by the CPU 10, and the predetermined compression processing is applied to the image data by the codec LSI 27. Furthermore, the image data subjected to the compression processing is sent to the terminal device 7 via the antenna 29 by the terminal communication module 28. The terminal device 7 receives the image data sent from the game apparatus 3 by the wireless module 90 and the image data is subjected to the predetermined expansion processing by the codec LSI 86. The image data subjected to the expansion processing is output to the LCD 51. Therefore, the front page of the program guide program 412 is displayed on the LCD 51 of the terminal device 7. Hereinafter, this is true for a case where image data is sent from the game apparatus 3 to the terminal device 7.

Returning to FIG. 13, in a step S59, operation data from the terminal device 7 is acquired; however, in a case where no operation data is sent from the terminal device 7, operation data is not acquired in the step S59. Next, in a step S61, it is determined whether or not the operation data indicates an operation of the expansion function. If "YES" is determined in the step S61, that is, if the operation data indicates an operation of the expansion function, in a step S63, the processing for an operated expansion function is performed, and then, the process proceeds to a step S67. In addition, an expansion function that is performed is any one of a number of expansion functions including the above-described expansion functions (1)-(3).

On the other hand, if "NO" is determined in the step S61, that is, if not an operation of the expansion function, in a step S65, content control processing (see FIG. 14 and FIG. 15) described later is performed, and in a step S67, it is determined whether or not the program guide program 412 is to be ended. Here, the CPU 10 determines whether or not an instruction for ending the program guide program 412 is given by the user.

If "NO" is determined in the step S67, that is, if not to be ended, the process returns to the step S59. On the other hand, if "YES" is determined in the step S67, that is, if to be ended, the process returns to the main menu processing shown in FIG. 11.

Figure 14:
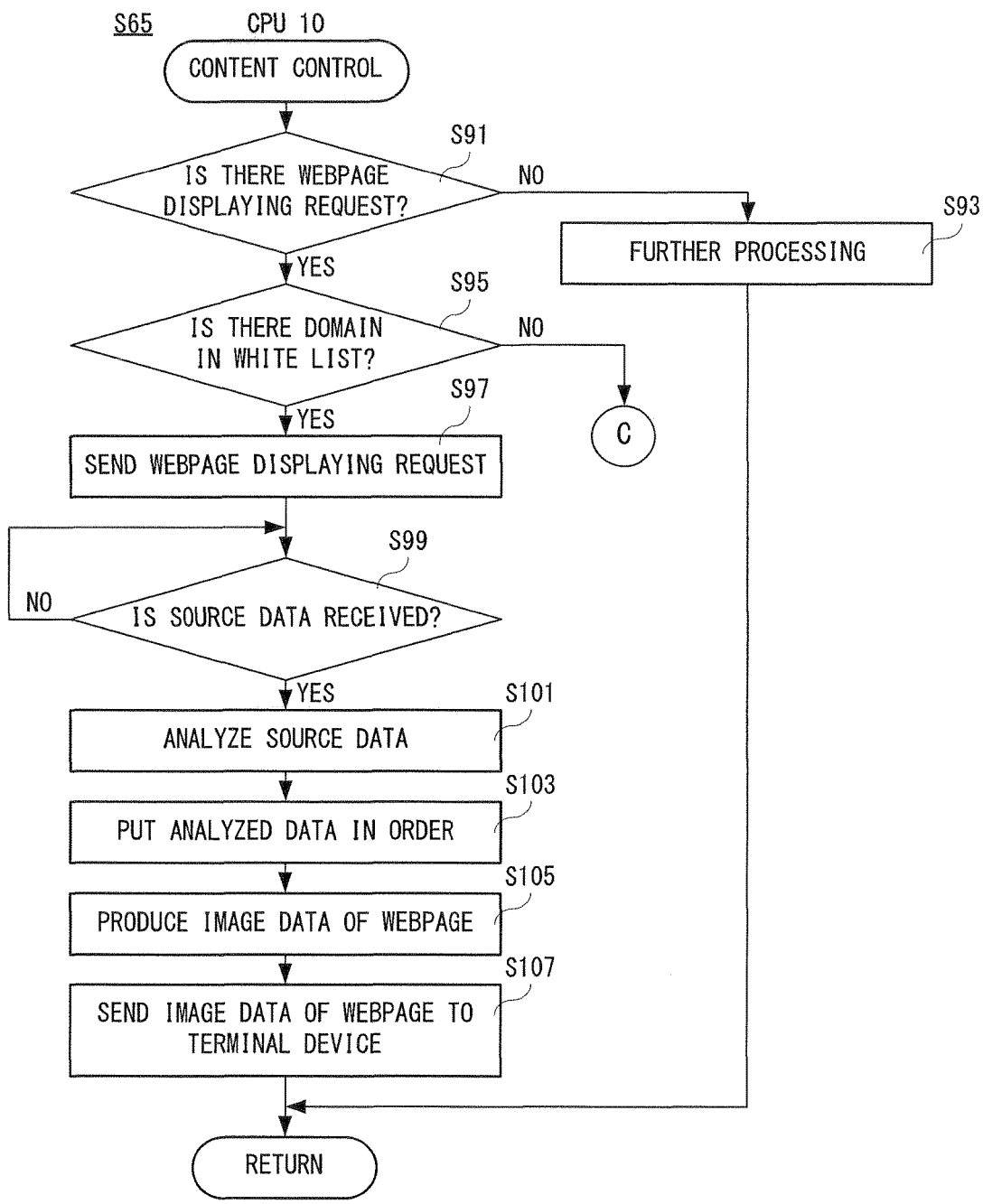
FIG. 14 is a flowchart showing a non-limiting example part of content control processing by the CPU of the game apparatus shown in FIG. 2.
Figure 15:
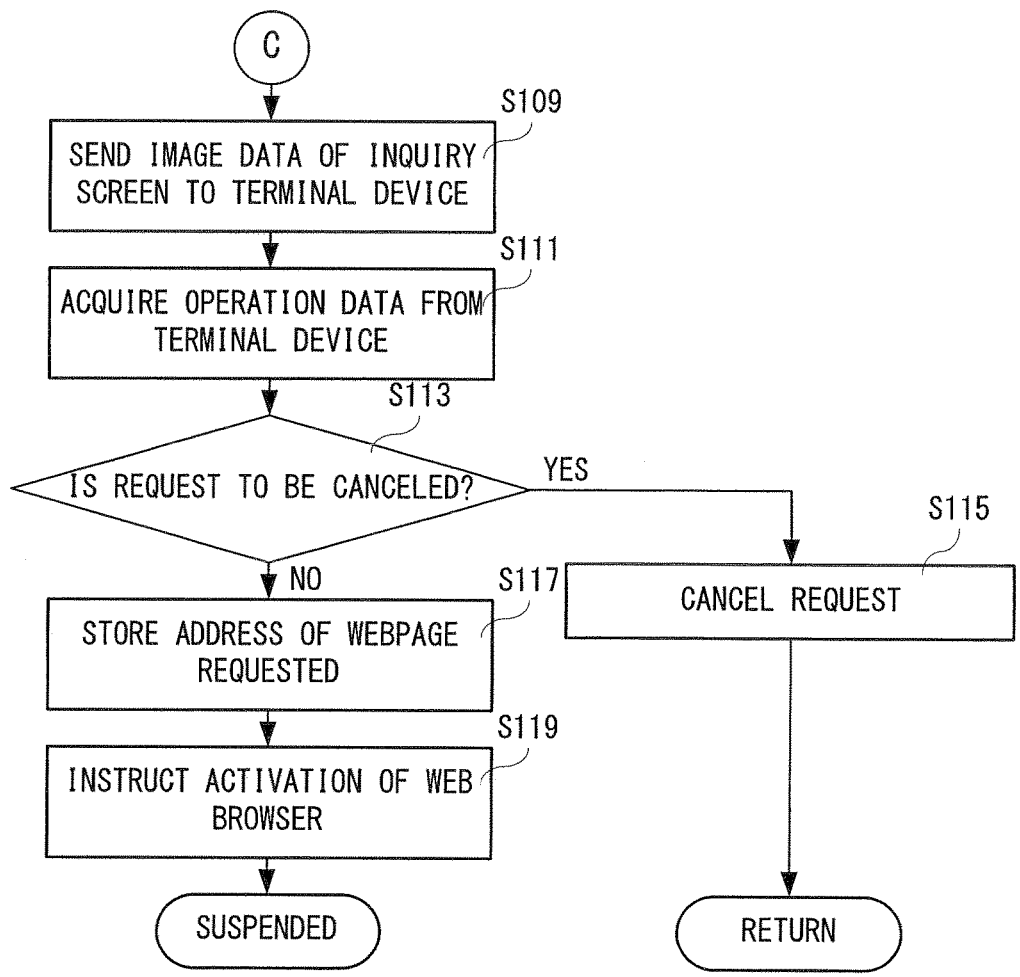
FIG. 15 is a flowchart showing a non-limiting example further part of the content control processing by the CPU of the game apparatus shown in FIG. 2, following FIG. 14.

FIG. 14 and FIG. 15 show flowcharts of the content control processing of the step S65 shown in FIG. 13. Hereinafter, although the content control processing is specifically described, the processing the same or similar to the processing described with referring to FIG. 12 and FIG. 13 will be simply described.

As shown in FIG. 14, the CPU 10 determines whether or not a webpage displaying request (request to display a webpage) exists in a step S91 if and when the content control processing is started. Here, the CPU 10 determines whether or not a webpage shown by a link set to an icon or character string displayed in a webpage such as a front page, a webpage for a result of a keyword search or the like is requested.

If "NO" is determined in the step S91, that is, if there is no webpage displaying request, further processing is performed in a step S93, and the process returns to the processing of the program guide program 412. As the further processing, a scroll of a screen of a webpage and a change of the displaying magnification, for example, can be considered; however, in a case where no operation exists, further processing is not performed.

On the other hand, if "YES" is determined in the step S91, that is, if there is a webpage displaying request, in a step S95, it is determined whether or not a domain name is recorded in the white list. If "YES" is determined in the step S95, in a step S97, a webpage sending request (request to send a webpage) is sent.

In a next step S99, it is determined whether or not source data is received. If "NO" is determined in the step S99, the process returns to the same step S99. On the other hand, if "YES" is determined in the step S99, the source data is analyzed in a step S101, the analyzed data is put in order in a step S103, and in a step S105, image data of a webpage is produced. Then, in a step S107, the image data of the webpage is sent to the terminal device 7, and then, the process returns to the processing of the program guide program 412.

Furthermore, if "NO" is determined in the step S95, as shown in FIG. 15, in a step S109, image data of an inquiry screen for inquiring whether or not a content request is to be canceled is sent to the terminal device 7. In a succeeding step S111, operation data from the terminal device 7 is acquired, and then, in a step S113, it is determined whether or not the content request is to be canceled. The CPU 10 determines whether or not the user selects to cancel the content request.

If "YES" is determined in the step S113, that is, if the cancel of the content request is selected, in a step S115, the content request is canceled, and then, the process returns to the processing of the program guide program 412. On the other hand, if "NO" is determined in the step S113, that is, if it is selected not to cancel the content request, in a step S117, an address of a requested webpage is stored. That is, the request data 436 is stored. Subsequently, in a step S119, an activation of the browser program 416 is instructed, and the processing of the program guide program 412 is suspended (temporarily stopped).

In addition, although not shown, in a case where the processing of the browser program 416 is terminated, and the processing of the program guide program 412 is to be resumed, the processing is resumed at the step S59, for example.

Figure 16:
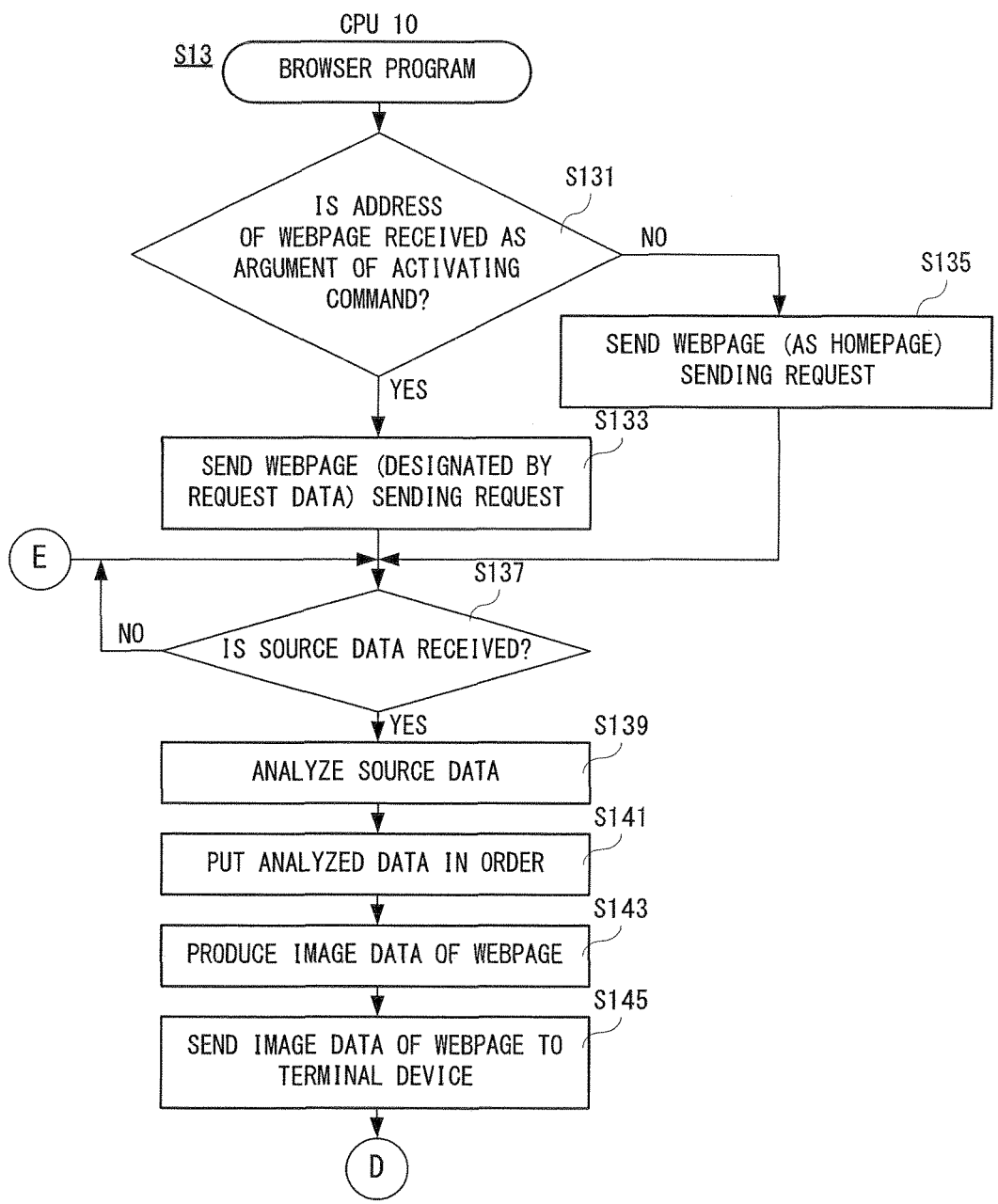
FIG. 16 is a flowchart showing a non-limiting example part of processing of a browsing program by the CPU of the game apparatus shown in FIG. 2.
Figure 17:
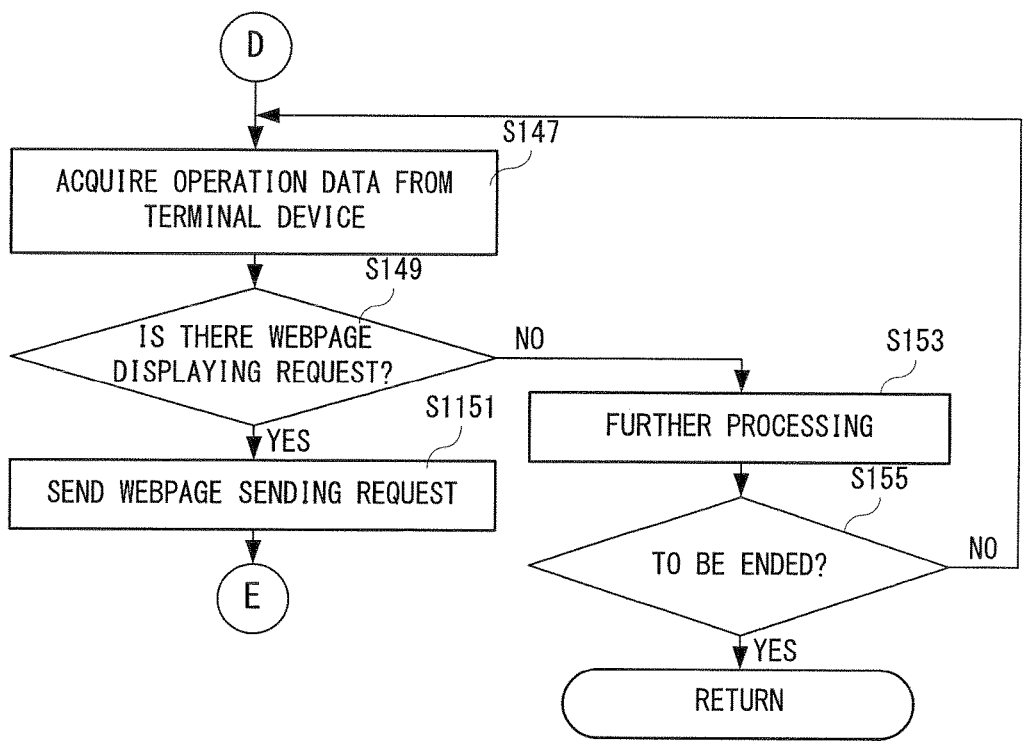
FIG. 17 is a flowchart showing a non-limiting example further part of processing of a browsing program by the CPU of the game apparatus shown in FIG. 2, following FIG. 16.

FIG. 16 and FIG. 17 show flowcharts of processing of the browser program 416 in the step S13 shown in FIG. 11. Hereinafter, although the processing of the browser program 416 is specifically described, the processing the same or similar to the above-described processing will be simply described.

As shown in FIG. 16, the CPU 10 determines whether or not an address of a webpage is received as an argument of an activating command in a step S131 if and when the processing of the browser program 416 is started. That is, the CPU 10 determines whether or not an execution of the browser program 416 is instructed by the program guide program 412 and the request data 436 is stored.

If "YES" is determined in the step S131, that is, if an address of a webpage as an argument of the activating command is received, in a step S133, a webpage sending request shown by the request data 436 is sent, and the process proceeds to a step S137. If "NO" is determined in the step S131, that is, in a case where an address of a webpage is not received as an argument of the activating command, in a step S135, a sending request of a webpage that is set as the homepage is sent, and the process proceeds to the step S137.

In the step S137, it is determined whether or not source data is received. If "NO" is determined in the step S137, the process returns to the same step S137. On the other hand, if "YES" is determined in the step S137, source data is analyzed in a step S139, the analyzed data is put in order in a step S141, and image data of a webpage is produced in a step S143. Then, in a step S145, the image data of a webpage is sent to the terminal device 7.

Subsequently, as shown in FIG. 17, in a step S147, operation data from the terminal device 7 is acquired, and then, in a step S149, it is determined whether or not there is a request to display a webpage. If "YES" is determined in the step S149, in a step S151, a webpage sending request is sent, and then, the process returns to the step S137. On the other hand, if "NO" is determined in the step S149, in a step S153, further processing is performed. In addition, the further processing to be performed in this step S153 is the same or similar to the further processing described in the step S93.

Then, in a step S155, it is determined whether or not the browser program 416 is to be ended. Here, it is determined whether or not an end of the browser program 416 is designated by the user. If "NO" is determined in the step S155, that is, if not to be ended, the process returns to the step S147. On the other hand, if "YES" is determined in the step S155, that is, if to be ended, the process returns to the main menu processing.

According to this embodiment, a white list is downloaded from a managing server at a side of the provider of a content, and with referring to the white list, an external server is accessed, and therefore, it is possible for a side of the provider of a content to control a safety or security of an internet connection.

Furthermore, according to this embodiment, in a case where a content is requested to a server a domain name of which is not recorded in the white list, a web browser is used, and therefore, it is possible to acquire even a content which cannot be acquired by a predetermined application. That is, as for a server a domain name of which is not recorded in the white list, a safety or security of the internet connection is not guaranteed; however, in such a case, it is possible to acquire the content by using a web browser that a safety or security of the internet connection is guaranteed.

That is, as for a server a domain name of which is recorded in the white list, a safety or security of the internet connection is guaranteed, and such a server is accessed through an application program having an expansion function produced for receiving a specific service, and as for a server a domain name of which is not recorded in the white list, by switching to access by a web browser that a safety or security of an internet connection is guaranteed, it is possible to secure both of functionality and safety or security.

In addition, although in the embodiment, a case where a managing server and a service providing server which provides a television program guide are provided separately is described, it is possible to make the managing server function as a service providing server for a television program guide.

Furthermore, in this embodiment, only a case where a television program guide is provided as a specific service is described, but as described above, a specific service is not limited to a television program guide. Furthermore, two or more kinds of application programs for receiving a specific service may be stored in the game apparatus. In such a case, an application program selected in the main menu can be executed.

Furthermore, in this embodiment, a case where source data of a webpage is acquired as a content, but the content may be image (still image, moving image) data, sound (music) data, text data, etc.

Furthermore, in this embodiment, in a case where it is selected to request a webpage in which a URL that a domain not recorded in the white list is described is set, the processing of the program guide program is suspended, and the processing of a browser program is performed, but not limited thereto. The processing of the program guide program may be performed in the background, or the processing of the program guide program may be ended (forcedly ended).

Furthermore, a game system shown in this embodiment is a mere example, and therefore not limited thereto. As an example, a general-purpose personal computer (PC) may be provided instead of a game apparatus, and a tablet computer may be provided instead of a terminal device, and then, the PC and the tablet computer are connected to each other in a manner that a communication between the PC and the tablet computer can be performed, and a content may be output (displayed) to the tablet computer.

Furthermore, a game apparatus shown in this embodiment is connected to a terminal device in a manner that a communication can be performed with utilizing a near field communication (NFC) such as Bluetooth (registered trademark), but the game apparatus may communicate with the terminal device via a network. Furthermore, a game apparatus may be constructed as a single system in which a plurality of devices or modules each in charge of one, two or more out of communication processing, image processing, processing of an arbitrary application, and other processing are connected with each other in a communication-capable manner.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-described ASICs (application specific integrated circuits) and/or logic circuitry. In the case of a distributed processor architecture of arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An information processing system comprising a server which provides a specific service and an information processing apparatus including a predetermined application for receiving a provision of the specific service, wherein the information processing apparatus comprises at least one processor at least configured to:
   execute the predetermined application;
   acquire a white list from a server controlled by a provider which provides the specific service;
   when content for the specific service is requested in the predetermined application, determine, in accordance with the acquired white list, whether or not it is possible to access a server which provides the requested content in the predetermined application; and
   when it is determined that it is not possible to access the server which provides the requested content in the predetermined application, suspend operation of the predetermined application and activate another application, different from the predetermined application,
   wherein, when the other application is activated, the other application sends a request for the requested content to the server which provides the requested content, and the other application receives the requested content.

2. The information processing system according to claim 1, wherein the white list is acquired when the predetermined application is started.

3. The information processing system according to claim 1, wherein the at least one processor is further configured to authenticate the information processing apparatus with an authenticating apparatus prior to acquisition of the white list.

4. The information processing system according to claim 1, wherein the other application is a web browser.

5. The information processing system according to claim 1, wherein at least one processor is configured to determine, using the white list, whether or not it is possible to access a provider of the content in accessing the content displayed in the predetermined application.

6. The information processing system according to claim 1, further comprising a terminal device capable of communicating with the information processing apparatus, and wherein the at least one processor is further configured to acquire the content and output to the terminal device the acquired content.

7. An information processing system comprising a server which provides a specific service and an information processing apparatus including a predetermined application for receiving a provision of the specific service, wherein the information processing apparatus comprises at least one processor at least configured to:
   execute the predetermined application;
   acquire a white list from a server controlled by a provider which provides the specific service;
   when content for the specific service is requested in the predetermined application, determine, in accordance with the acquired white list, whether or not it is possible to access a server which provides the requested content in the predetermined application; and
   execute a further application different from the predetermined application when it is determined that it is impossible to access the server which provides the content, thereby to access the server which provides the content by the further application,
   wherein the at least one processor is configured to suspend the performance of the predetermined application prior to the execution of the further application.

8. An information processing apparatus comprising:
   storage storing a predetermined application for receiving a provision of a specific service from a server; and
   at least one processor configured at least to:
     execute the predetermined application;
     acquire a white list from a server controlled by a provider which provides the specific service;
     when content for the specific service is requested, determine, in accordance with the acquired white list, whether or not it is possible to access a server which provides the requested content in the predetermined application; and
     execute a further application different from the predetermined application when it is determined that it is impossible to access the server which provides the content, thereby to access the server which provides the content by the further application,
     wherein the at least one processor is configured to suspend the performance of the predetermined application prior to the execution of the further application.

9. The information processing apparatus of claim 8, wherein the at least one processor is further configured to:
   when the predetermined application is executed, send a request for the white list, the request including an electronic certificate authorizing the information processing apparatus to access the requested white list; and
   in response to the request, acquire the white list from the server controlled by the provider which provides the specific service.

10. The information processing apparatus of claim 8, wherein the white list includes server information providing a predefined level of security for communication.

11. A non-transitory computer readable storage medium storing an information processing program executable by a computer of an information processing apparatus including a predetermined application to receive a provision of a specific service from a server, wherein the information processing program, when executed, causes the computer at least to:
   execute the predetermined application;
   acquire a white list from a server controlled by a provider which provides the specific service;
   when content for the specific service is requested, determine, in accordance with the acquired white list, whether or not it is possible to access a server which provides the requested content in the predetermined application; and
   when it is determined that it is not possible to access the server which provides the requested content in the predetermined application, suspend operation of the predetermined application and activate another application, different from the predetermined application, wherein, when the other application is activated, the other application sends a request for the requested content to the server which provides the requested content, and the other application receives the requested content.

12. An information processing method performed by a computer of an information processing apparatus including a predetermined application to receive a provision of a specific service from a server, the information processing method comprising:

executing, using the computer, the predetermined application;

acquiring, using the computer, a white list from a server controlled by a provider which provides the specific service;

when content for the specific service is requested in the predetermined application, determining, in accordance with the acquired white list, whether or not it is possible to access a server which provides the requested content in the predetermined application; and when it is determined that it is not possible to access the server which provides the requested content in the predetermined application, suspend operation of the predetermined application and activate another application, different from the predetermined application, wherein, when the other application is activated, the other application sends a request for the requested content to the server which provides the requested content, and the other application receives the requested content.

13. An information processing apparatus comprising:
storage storing a predetermined application for receiving a provision of a specific service from a server; and
at least one processor configured at least to:
execute the predetermined application;
acquire a white list from a server controlled by a provider which provides the specific service;
when content for the specific service is requested, determine, in accordance with the acquired white list, whether or not it is possible to access a server which provides the requested content in the predetermined application; and
when it is determined that it is not possible to access the server which provides the requested content in the predetermined application, suspend operation of the predetermined application and activate another application, different from the predetermined application,
wherein, when the other application is activated, the other application sends a request for the requested content to the server which provides the requested content, and the other application receives the requested content.

14. The information processing apparatus of claim 13, wherein the other application provides a predetermined level of security for communication when receiving the requested content.

15. The information processing apparatus of claim 13, wherein the other application provides a level of security for communication when receiving the requested content that is higher than a level of security for communication provided by the predetermined application.

16. An information processing apparatus comprising:
storage storing a predetermined application for receiving a provision of a specific service from a server; and
at least one processor configured at least to:
execute the predetermined application;
acquire a white list from a server controlled by a provider which provides the specific service;
when content for the specific service is requested, determine, in accordance with the acquired white list, whether or not it is possible to access a server which provides the requested content in the predetermined application; and
when it is determined that it is not possible to access the server which provides the requested content in the predetermined application, store the request for content in storage and activate another application, different from the predetermined application, for retrieving the requested content from the server which provides the requested content based on the request for content stored in storage.

* * * * *